US012660009B2

(12) United States Patent
Xin et al.

(10) Patent No.: US 12,660,009 B2
(45) Date of Patent: Jun. 16, 2026

---

(54) COMMUNICATIONS METHOD AND COMMUNICATIONS APPARATUS

(71) Applicant: HUAWEI TECHNOLOGIES CO., LTD., Shenzhen (CN)

(72) Inventors: Tingyu Xin, Shenzhen (CN); Yan Wang, Beijing (CN); Zhenzhen Cao, Boulogne Billancourt (FR); Bingzhao Li, Beijing (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 716 days.

(21) Appl. No.: 17/993,572

(22) Filed: Nov. 23, 2022

(65) Prior Publication Data

US 2023/0099930 A1     Mar. 30, 2023

Related U.S. Application Data

(63) Continuation of application No. PCT/CN2021/095907, filed on May 26, 2021.

(30) Foreign Application Priority Data

May 28, 2020     (CN) .......................... 202010467287.4

(51) Int. Cl.
| *H04W 76/10* | (2018.01) |
| *H04W 4/06* | (2009.01) |
| *H04W 4/12* | (2009.01) |

(52) U.S. Cl.
CPC ............. *H04W 76/10* (2018.02); *H04W 4/06* (2013.01); *H04W 4/12* (2013.01)

(58) Field of Classification Search
CPC ......... H04W 76/10; H04W 4/06; H04W 4/12; H04W 92/12; H04W 76/12; H04W 76/40; H04W 76/15

(Continued)

(56) References Cited

U.S. PATENT DOCUMENTS

| 7,561,880 B2 * | 7/2009 | Moon | ............... | H04W 36/0007 455/442 |
| 2010/0223391 A1 * | 9/2010 | Wu | ..................... | H04L 12/1854 709/230 |

(Continued)

FOREIGN PATENT DOCUMENTS

| CN | 105491535 A | 4/2016 |
| CN | 109392023 A | 2/2019 |
| CN | 109769150 A | 5/2019 |
| CN | 110392347 A | 10/2019 |
| CN | 110475210 A | 11/2019 |
| CN | 110475381 A | 11/2019 |

(Continued)

OTHER PUBLICATIONS

Huawei, HiSilicon, Rel-17 work scope on NR Multicast and Broadcast Services. 3GPP TSG RAN Meeting #84, Newport Beach, USA, Jun. 3-7, 2019, RP-191012, 4 pages.

(Continued)

*Primary Examiner* — Rownak Islam
(74) *Attorney, Agent, or Firm* — HAUPTMAN HAM, LLP

(57) ABSTRACT

A communications method and a communications apparatus. For a radio bearer that carries a multicast service, a downlink user plane tunnel is established between a first access network node and a second access network node. A data packet of the multicast service is transmitted through the downlink user plane tunnel to enable the multicast service to be transmitted in a CU-DU architecture. A unicast tunnel is also established to transmit a data packet of the multicast service that is sent in a unicast mode. In this way, the first access network node is able to transmit the data packet of the multicast service to the second access network node on the unicast tunnel in the unicast mode.

22 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2017/0251363 A1* | 8/2017 | Pothula | ................ | H04L 63/061 |
| 2019/0124181 A1 | 4/2019 | Park et al. | | |
| 2020/0077287 A1 | 3/2020 | Prasad et al. | | |
| 2021/0168570 A1* | 6/2021 | Navratil | ............... | H04W 72/30 |
| 2022/0217508 A1* | 7/2022 | Xiong | ................ | H04L 61/5007 |
| 2023/0018193 A1* | 1/2023 | Zhong | .................... | H04W 4/06 |
| 2024/0298380 A1* | 9/2024 | Wang | ...................... | H04W 4/06 |

FOREIGN PATENT DOCUMENTS

| | | | |
|---|---|---|---|
| EP | 2769503 B1 | 5/2018 | |
| EP | 4094541 A1 | 11/2022 | |
| WO | 2019179602 A1 | 9/2019 | |
| WO | 2020035795 A1 | 2/2020 | |
| WO | 2021149936 A1 | 7/2021 | |

OTHER PUBLICATIONS

3GPP TS 38.401 V16.1.0 (Mar. 2020), 3rd Generation Partnership Project; Technical Specification Group Radio Access Network; NG-RAN; Architecture description(Release 16), 50 pages.

3GPP TS 38.473 V16.1.0 (Mar. 2020), 3rd Generation Partnership Project; Technical Specification Group Radio Access Network; NG-RAN; F1 application protocol (F1AP)(Release 16), 240 pages.

3GPP TS 38.413 V16.1.0 (Mar. 2020), 3rd Generation Partnership Project; Technical Specification Group Radio Access Network; NG-RAN; NG Application Protocol (NGAP)(Release 16), 341 pages.

3GPP TS 38.300 V16.1.0 (Mar. 2020), 3rd Generation Partnership Project; Technical Specification Group Radio Access Network; NR; NR and NG-RAN Overall Description; Stage 2(Release 16), 133 pages.

3GPP TS 23.003 V16.2.0 (Mar. 2020), 3rd Generation Partnership Project; Technical Specification Group Core Network and Terminals; Numbering, addressing and identification; (Release 16), 139 pages.

International Search Report issued in corresponding International Application No. PCT/CN2021/095907, dated Aug. 16, 2021, pp. 1-10.

Chinese Office Action issued in corresponding Chinese Application No. 202010467287.4, dated Sep. 19, 2022, pp. 1-13.

India Examination Report issued in corresponding India Application No. 202237068703, dated Sep. 1, 2023, pp. 1-5.

David Vargas et al., RAN Logical Architecture and Interfaces for 5G-Xcast. Deliverable D3.3, Version v2.0, Feb. 28, 2019, 95 pages.

Extended European Search Report issued in corresponding European Application No. 21812807.2, dated Oct. 6, 2023, pp. 1-13.

* cited by examiner

700

800

900

PDU session X for UE 1

QoS flow 1 for a unicast service — Tunnel 1

QoS flow B for a multicast service — Tunnel 2

PDU session Y for UE 2

QoS flow A for a multicast service — Tunnel 2

QoS flow 3 for a unicast service — Tunnel 3

CU-CP or CU

AMF

1201: First signaling

1202: Second signaling

Unicast PDU session M for UE 1

QoS flow 1 for a unicast service — Tunnel 1

Multicast PDU session N for UE 1

QoS flow B for a multicast service — Tunnel 2

Multicast PDU session Y for UE 2

QoS flow A for a multicast service — Tunnel 2

Unicast PDU session X for UE 2

QoS flow 3 for a unicast service — Tunnel 3

CU-CP or CU

AMF

1401: Third signaling

1402: Fourth signaling

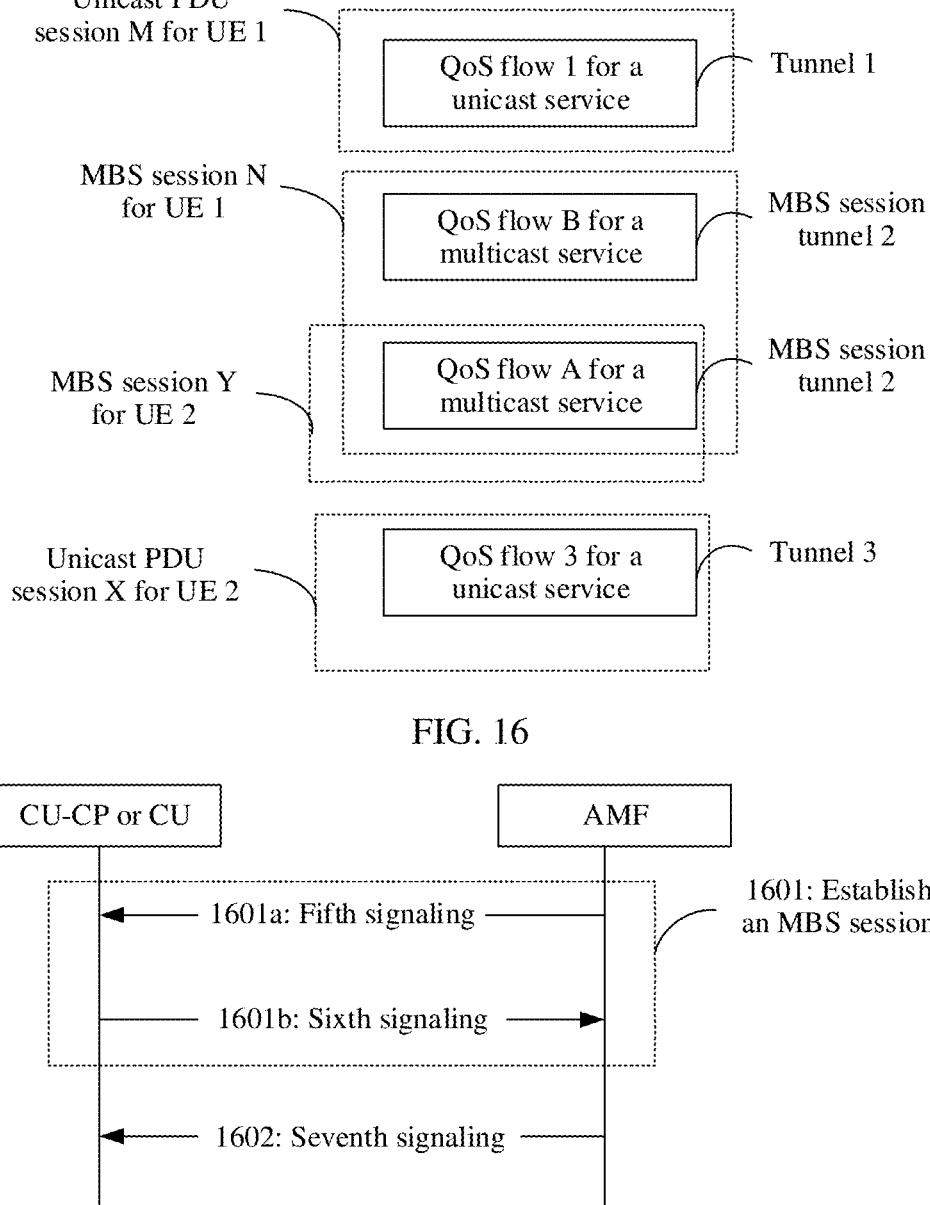

Unicast PDU session M for UE 1

QoS flow 1 for a unicast service — Tunnel 1

MBS session N for UE 1

QoS flow B for a multicast service — MBS session tunnel 2

MBS session Y for UE 2

QoS flow A for a multicast service — MBS session tunnel 2

Unicast PDU session X for UE 2

QoS flow 3 for a unicast service — Tunnel 3

FIG. 16

CU-CP or CU        AMF

1601a: Fifth signaling

1601b: Sixth signaling

1601: Establish an MBS session

1602: Seventh signaling

1603: Eighth signaling

FIG. 17

COMMUNICATIONS METHOD AND COMMUNICATIONS APPARATUS

CROSS-REFERENCE TO RELATED APPLICATIONS

This application is a continuation of International Application No. PCT/CN2021/095907, filed on May 26, 2021, which claims priority to Chinese Patent Application No. 202010467287.4, filed on May 28, 2020. The disclosures of the aforementioned applications are hereby incorporated by reference in their entireties.

TECHNICAL FIELD

This application relates to the communications field, and more specifically, to a communications method and a communications apparatus.

BACKGROUND

A multimedia broadcast multicast service (multimedia broadcast multicast service, MBMS) is a service oriented to a plurality of user equipments (user equipment, UE), for example, live streaming and scheduled program playing. A multicast transmission technology is a technology in which an MBMS is simultaneously sent to a plurality of UEs by using a base station. Between a network and UE, an MBMS may be sent to the UE in a unicast mode by establishing a bearer dedicated to the UE, or may be sent to the UE in a multicast mode by establishing a bearer dedicated to the MBMS.

Currently, the multimedia broadcast multicast service does not relate to transmission in a central unit (centralized unit, CU)-distributed unit (distributed unit, DU) architecture.

SUMMARY

This application provides a communications method and a communications apparatus, to transmit a multicast service in a CU-DU architecture.

According to a first aspect, a communications method is provided. For example, the communications method may be performed by a first access network node, or may be performed by a component (such as a circuit or a chip) in the first access network node. This is not limited in this application.

Specifically, the first access network node sends a first message to a second access network node, where the first message is used to request to establish a first radio bearer, the first message includes a first indication, and the first indication indicates that the first radio bearer carries a first multicast service. Then, the first access network node receives a second message from the second access network node, where the second message includes first transport layer information corresponding to the first radio bearer. Finally, the first access network node sends a first data packet of the first multicast service to the second access network node based on the first transport layer information. In this way, a multicast service can be transmitted in a CU-DU architecture.

Optionally, the first transport layer information includes a first user plane address. The first user plane address corresponds to a downlink user plane tunnel (or referred to as a multicast tunnel) established by the second access network node to transmit the first multicast service. In this way, the first access network node can transmit, to the second access network node on the downlink user plane tunnel, a data packet of the first multicast service that is received from a core network node or a multicast control function node. A plurality of multicast services/multicast service flows may share a same multicast tunnel, and a data packet sent on the multicast tunnel may be received by a plurality of terminal devices. This helps save resources, improve spectrum utilization, reduce a delay, and reduce complexity of a network device. The plurality of terminal devices are a plurality of terminal devices that receive a same multicast service. Because the plurality of multicast services/multicast service flows share the same multicast tunnel, there is no need to occupy a plurality of tunnels. This reduces resource occupation on a network device side, alleviates processing load of the network device, imposes no excessively high requirement on a capability of the network device, and reduces complexity of the network device.

In a possible implementation, the first indication is determined based on a third message from a core network node or a multicast control function node, the third message includes a second indication, and the second indication indicates the first multicast service. Therefore, the first access network node may learn of the multicast service by receiving the third message from the core network node or the multicast control function node.

In a possible implementation, the method further includes: The first access network node sends a third data packet of the first multicast service to the second access network node based on second transport layer information, where the second transport layer information is carried in the second message. Optionally, the second transport layer information includes a second user plane address. The second user plane address corresponds to a unicast tunnel established by the second access network node for a unicast transmission mode. The unicast tunnel is used to transmit a data packet of the multicast service that is sent in the unicast mode. In this way, the first access network node can transmit, to the second access network node on the unicast tunnel in the unicast mode, a data packet of the first multicast service that is received from the core network node or the multicast control function node.

In a possible implementation, the method further includes: The first access network node sends a notification message to the second access network node, where the notification message is used to indicate a transmission mode in which the second access network node sends a data packet of the first multicast service, and the transmission mode includes a unicast mode and/or a multicast mode. Therefore, the first access network node may determine the transmission mode in which the second access network node sends a data packet of the multicast service, so that an appropriate transmission mode can be determined based on a channel condition of a terminal device, thereby ensuring quality of a service received by the terminal device.

Optionally, the transmission mode is determined based on a measurement result of a first terminal device. Herein, the first access network node may determine, with reference to the measurement result of the first terminal device, the transmission mode in which the second access network node sends a data packet of the multicast service. This can ensure/improve service transmission quality while saving resources, thereby optimizing experience of each user. In this way, the first access network node may learn of signal quality based on measurement results of different terminal devices, to select a transmission mode for each terminal device based on a channel condition of each terminal device.

Quality of a service received by the terminal device has a corresponding quality requirement. The quality requirement may be determined by a core network device or a higher layer device. Specifically, if the signal quality is relatively good, the first access network node may determine that the transmission mode is the multicast mode. If the signal quality is average, the first access network node may determine that the transmission mode is the unicast mode, or the multicast mode and the unicast mode. This improves service transmission quality, and improves experience of each user.

Optionally, the third message further includes a multicast security parameter, and the multicast security parameter includes a security key and/or a security algorithm. Further, security activation may be performed by using the multicast security parameter, to ensure security of a user and a network device, prevent data from being eavesdropped and/or tampered with, improve communication security, ensure network security, and ensure user rights.

According to a second aspect, a communications method is provided. For example, the communications method may be performed by a second access network node, or may be performed by a component (such as a circuit or a chip) in the second access network node. This is not limited in this application.

Specifically, the second access network node receives a first message from a first access network node, where the first message is used to request to establish a first radio bearer, the first message includes a first indication, and the first indication indicates that the first radio bearer carries a first multicast service. Then, the second access network node sends a second message to the first access network node, where the second message includes first transport layer information corresponding to the first radio bearer. Next, the second access network node receives a first data packet of the first multicast service from the first access network node based on the first transport layer information. Finally, the second access network node sends a second data packet of the first multicast service to a first terminal device by using the first radio bearer. In this way, a multicast service can be transmitted in a CU-DU architecture.

Optionally, the first transport layer information includes a first user plane address. The first user plane address corresponds to a downlink user plane tunnel (or referred to as a multicast tunnel) established by the second access network node to transmit the first multicast service. In this way, a plurality of multicast services/multicast service flows may share a same multicast tunnel, and a data packet sent on the multicast tunnel may be received by a plurality of terminal devices. This helps save resources, improve spectrum utilization, reduce a delay, and reduce complexity of a network device. The plurality of terminal devices are a plurality of terminal devices that receive a same multicast service. Specifically, because the plurality of multicast services/ multicast service flows share the same multicast tunnel, there is no need to occupy a plurality of tunnels. This reduces resource occupation on a network device side, alleviates processing load of the network device, imposes no excessively high requirement on a capability of the network device, and reduces complexity of the network device.

In a possible implementation, the method further includes: The second access network node receives a third data packet of the first multicast service from the first access network node based on second transport layer information, where the second transport layer information is carried in the second message. The second transport layer information includes a second user plane address. The second user plane address may correspond to an established unicast tunnel.

The unicast tunnel is used to transmit a data packet of the multicast service that is sent in a unicast mode. Herein, the second access network node may receive a unicast data packet sent by the first access network node through the unicast tunnel, to map the unicast data packet to a corresponding logical channel, and send the unicast data packet to the first terminal device.

In a possible implementation, the method further includes: The second access network node receives a notification message from the first access network node, where the notification message is used to indicate a transmission mode in which the second access network node sends a data packet of the first multicast service, and the transmission mode includes a unicast mode and/or a multicast mode. Herein, the second access network node may learn of the transmission mode from the first access network node, to send the data packet of the multicast service in the transmission mode. Therefore, the second access network node does not need to determine the transmission mode. An advantage of determining the transmission mode by the first access network node is that an appropriate transmission mode can be determined based on a channel condition of a terminal device, to ensure quality of a service received by the terminal device.

In a possible implementation, the method further includes: The second access network node sends a fourth message to the first access network node, where the fourth message includes a measurement result of the first terminal device. Herein, the second access network node may report the measurement result to the first access network node, so that the first access network node can determine the transmission mode with reference to the measurement result. This can ensure/improve service transmission quality while saving resources, thereby optimizing experience of each user. Quality of a service received by the terminal device has a corresponding quality requirement. The quality requirement may be determined by a core network device or a higher layer device. Specifically, if the signal quality is relatively good, the first access network node may determine that the transmission mode is the multicast mode. If the signal quality is average, the first access network node may determine that the transmission mode is the unicast mode, or the multicast mode and the unicast mode. This improves service transmission quality, and improves experience of each user.

In a possible implementation, the method further includes: The second access network node determines, based on a measurement result of the first terminal device, a transmission mode for sending a data packet of the first multicast service, where the transmission mode includes a unicast mode and/or a multicast mode. Herein, the second access network node may alternatively determine the transmission mode, and does not need to obtain the transmission mode from the first access network node. One first access network node may correspond to a plurality of second access network nodes. Therefore, if each second access network node reports a measurement result to the first access network node, excessive signaling interaction is caused, and service load of the first access network node is increased. In this implementation, the second access network node does not need to send the measurement result to the first access network node, and the first access network node does not need to send the transmission mode to the second access network node. This reduces signaling interaction between the first access network node and the second access network node, reduces a delay, and alleviates service load of the first access network node. The second access network node needs to manage only a terminal device working on the node, and make a corresponding decision based on a measurement result reported by the terminal device, to ensure service quality.

In a possible implementation, that the second access network node sends a second data packet of the first multicast service to a first terminal device by using the first radio bearer includes: when the multicast mode is used, sending, to the first terminal device by using the first radio bearer, the first data packet received based on the first transport layer information: or when the unicast mode is used, sending, to the first terminal device by using the first radio bearer, the third data packet received based on the second transport layer information. Therefore, in a CU-DU scenario, the second access network node may send the data packet to the first terminal device in the unicast mode and/or the multicast mode, to transmit the data packet of the multicast service on an air interface.

According to a third aspect, a communications method is provided. For example, the communications method may be performed by a third access network node, or may be performed by a component (such as a circuit or a chip) in the third access network node. This is not limited in this application.

Specifically, the third access network node sends a fifth message to a fourth access network node, where the fifth message is used to request to establish a first radio bearer, the fifth message includes a third indication, and the third indication indicates that the first radio bearer carries a first multicast service. Then, the third access network node sends a sixth message to a second access network node, where the sixth message is used to request to establish the first radio bearer, the sixth message includes a first indication, and the first indication indicates that the first radio bearer carries the first multicast service. Next, the third access network node receives a second message from the second access network node, where the second message includes first transport layer information corresponding to the first radio bearer. Finally, the third access network node sends a seventh message to the fourth access network node, where the seventh message includes the first transport layer information. In this way, a multicast service can be transmitted in a CU-CP-CU-UP split architecture.

Optionally, the first indication is determined based on a third message from a core network node or a multicast control function node, the third message includes a second indication, and the second indication indicates the first multicast service. Therefore, the third access network node may learn, by receiving the third message from the core network node or the multicast control function node, that a service to be subsequently transmitted is the multicast service.

Optionally, the second message further includes second transport layer information, and the seventh message further includes the second transport layer information. Optionally, the second transport layer information includes a second user plane address. The second user plane address corresponds to a unicast tunnel established by the second access network node for a unicast transmission mode. The unicast tunnel is used to transmit a data packet of the multicast service that is sent in a unicast mode. Herein, the third access network node may notify the fourth access network node of the second transport layer information, so that the fourth access network node can send the data packet to the second access network node based on the second transport layer information.

In a possible implementation, the method further includes: The third access network node sends a notification message to the second access network node, where the notification message is used to indicate a transmission mode in which the second access network node sends a data packet of the first multicast service, and the transmission mode includes a unicast mode and/or a multicast mode. In other words, the third access network node may determine the transmission mode, and notify the second access network node of the transmission mode, so that an appropriate transmission mode can be determined based on a channel condition of a terminal device, thereby ensuring quality of a service received by the terminal device.

In a possible implementation, the transmission mode is determined based on a measurement result of a first terminal device. The third access network node may determine, with reference to the measurement result of the first terminal device, the transmission mode in which the second access network node sends a data packet of the multicast service. This can ensure/improve service transmission quality while saving resources, thereby optimizing experience of each user. In this way, the third access network node may learn of signal quality based on measurement results of different terminal devices, to select a transmission mode for each terminal device based on a channel condition of each terminal device. Quality of a service received by the terminal device has a corresponding quality requirement. The quality requirement may be determined by a core network device or a higher layer device. Specifically, if the signal quality is relatively good, the third access network node may determine that the transmission mode is the multicast mode. If the signal quality is average, the third access network node may determine that the transmission mode is the unicast mode, or the multicast mode and the unicast mode. This improves service transmission quality, and improves experience of each user.

Optionally, the third message includes a multicast security parameter, and the multicast security parameter includes a security key and/or a security algorithm. Further, security activation may be performed by using the multicast security parameter, to ensure security of a user and a network device, prevent data from being eavesdropped and/or tampered with, improve communication security, ensure network security, and ensure user rights.

Optionally, the fifth message includes the multicast security parameter, and the multicast security parameter includes the security key and/or the security algorithm.

According to a fourth aspect, a communications method is provided. For example, the communications method may be performed by a fourth access network node, or may be performed by a component (such as a circuit or a chip) in the fourth access network node. This is not limited in this application.

Specifically, the fourth access network node receives a fifth message from a third access network node, where the fifth message is used to request to establish a first radio bearer, the fifth message includes a third indication, and the third indication indicates that the first radio bearer carries a first multicast service. Then, the fourth access network node receives a seventh message from the third access network node, where the seventh message includes first transport layer information. Finally, the fourth access network node sends a first data packet of the first multicast service to a second access network node based on the first transport layer information. In this way, a multicast service can be transmitted in a CU-CP-CU-UP split architecture.

In a possible implementation, the method further includes: The fourth access network node sends a third data packet of the first multicast service to the second access network node based on second transport layer information, where the second transport layer information is carried in the seventh message. The second transport layer information includes a second user plane address. The second user plane address may correspond to an established unicast tunnel. Herein, the fourth access network node may send a unicast data packet to the second access network node through the unicast tunnel.

Optionally, the fifth message includes a multicast security parameter, and the multicast security parameter includes a security key and/or a security algorithm. Further, security activation may be performed by using the multicast security parameter, to ensure security of a user and a network device, prevent data from being eavesdropped and/or tampered with, improve communication security, ensure network security, and ensure user rights.

According to a fifth aspect, a communications method is provided. For example, the communications method may be performed by a second access network node, or may be performed by a component (such as a circuit or a chip) in the second access network node. This is not limited in this application.

Specifically, the second access network node receives a sixth message from a third access network node, where the sixth message is used to request to establish a first radio bearer, the sixth message includes a first indication, and the first indication indicates that the first radio bearer carries a first multicast service. Then, the second access network node sends a second message to the third access network node, where the second message includes first transport layer information corresponding to the first radio bearer. Next, the second access network node receives a first data packet of the first multicast service from a fourth access network node based on the first transport layer information. Finally, the second access network node sends a second data packet of the first multicast service to a first terminal device by using the first radio bearer. In this way, a multicast service can be transmitted in a CU-CP-CU-UP split architecture.

Optionally, the first transport layer information includes a first user plane address. The first user plane address corresponds to a downlink user plane tunnel (or referred to as a multicast tunnel) established by the second access network node to transmit the first multicast service. In this way, a plurality of multicast services/multicast service flows may share a same multicast tunnel, and a data packet sent on the multicast tunnel may be received by a plurality of terminal devices. This helps save resources, improve spectrum utilization, reduce a delay, and reduce complexity of a network device. The plurality of terminal devices are a plurality of terminal devices that receive a same multicast service. Specifically, because the plurality of multicast services/ multicast service flows share the same multicast tunnel, there is no need to occupy a plurality of tunnels. This reduces resource occupation on a network device side, alleviates processing load of the network device, imposes no excessively high requirement on a capability of the network device, and reduces complexity of the network device.

In a possible implementation, the method further includes: The second access network node receives a third data packet of the first multicast service from the fourth access network node based on second transport layer information, where the second transport layer information is carried in the second message. The second transport layer information includes a second user plane address. The second user plane address may correspond to an established unicast tunnel. Herein, the second access network node may receive a unicast data packet sent by the fourth access network node through the unicast tunnel, to map the unicast data packet to a corresponding logical channel, and send the unicast data packet to the first terminal device.

In a possible implementation, the method further includes: The second access network node receives a notification message from the third access network node, where the notification message is used to indicate a transmission mode in which the second access network node sends a data packet of the first multicast service, and the transmission mode includes a unicast mode and/or a multicast mode. Herein, the second access network node may obtain the transmission mode from the third access network node, and does not need to determine the transmission mode. An advantage of determining the transmission mode by the third access network node is that an appropriate transmission mode can be determined based on a channel condition of a terminal device, to ensure quality of a service received by the terminal device.

In a possible implementation, the method further includes: The second access network node sends a fourth message to the third access network node, where the fourth message includes a measurement result of the first terminal device. Therefore, the second access network node reports the measurement result to the third access network node, so that the third access network node can determine the transmission mode with reference to the measurement result. This can ensure/improve service transmission quality while saving resources, thereby optimizing experience of each user. Quality of a service received by the terminal device has a corresponding quality requirement. The quality requirement may be determined by a core network device or a higher layer device. Specifically, if the signal quality is relatively good, the third access network node may determine that the transmission mode is the multicast mode. If the signal quality is average, the third access network node may determine that the transmission mode is the unicast mode, or the multicast mode and the unicast mode. This improves service transmission quality, and improves experience of each user.

In a possible implementation, the method further includes: The second access network node determines, based on a measurement result of the first terminal device, a transmission mode for sending a data packet of the first multicast service, where the transmission mode includes a unicast mode and/or a multicast mode. Herein, the second access network node may alternatively determine the transmission mode, and does not need to obtain the transmission mode from the third access network node. One access network node may correspond to a plurality of second access network nodes. Therefore, if each second access network node reports a measurement result to the third access network node, excessive signaling interaction is caused, and service load of the third access network node is increased. In this implementation, the second access network node does not need to send the measurement result to the third access network node, and the third access network node does not need to send the transmission mode to the second access network node. This reduces signaling interaction between the third access network node and the second access network node, reduces a delay, and alleviates service load of the third access network node. The second access network node needs to manage only a terminal device working on the node, and make a corresponding decision based on a measurement result reported by the terminal device, to ensure service quality.

In a possible implementation, that the second access network node sends a data packet of the first multicast service to a first terminal device by using the first radio bearer includes: when the multicast mode is used, sending, to the first terminal device by using the first radio bearer, the data packet received based on the first transport layer information: or when the unicast mode is used, sending, to the first terminal device by using the first radio bearer, the data packet received based on the second transport layer information. Therefore, in a CU-CP-CU-UP scenario, the second access network node may send the data packet to the first terminal device in the unicast mode and/or the multicast mode, to transmit the data packet of the multicast service on an air interface.

According to a sixth aspect, a communications method is provided. For example, the communications method may be performed by a multicast control function node, or may be performed by a component (such as a circuit or a chip) in the multicast control function node. This is not limited in this application.

Specifically, the multicast control function node receives an eighth message from a core network node, where the eighth message is used to request to establish a first radio bearer, the eighth message includes a fourth indication, and the fourth indication indicates that the first radio bearer carries a first multicast service. Then, the multicast control function node sends a third message to a first access network node, where the third message is used to request to establish the first radio bearer, the third message includes a second indication, and the second indication indicates that the first radio bearer carries the first multicast service. Finally, the multicast control function node sends a notification message to the first access network node, where the notification message is used to indicate a transmission mode in which a second access network node sends a data packet of the first multicast service, and the transmission mode includes a unicast mode and/or a multicast mode. Therefore, the multicast control function node is introduced, and the multicast control function node determines the transmission mode, so that a multicast service can be transmitted in a CU-DU architecture.

Optionally, the transmission mode is determined based on a measurement result of a first terminal device. Herein, the multicast control function node may determine the transmission mode with reference to the measurement result. This can ensure/improve service transmission quality while saving resources, thereby optimizing experience of each user. Quality of a service received by a terminal device has a corresponding quality requirement. The quality requirement may be determined by a core network device or a higher layer device. Specifically, if the signal quality is relatively good, the multicast control function node may determine that the transmission mode is the multicast mode. If the signal quality is average, the multicast control function node may determine that the transmission mode is the unicast mode, or the multicast mode and the unicast mode. This improves service transmission quality, and improves experience of each user.

Optionally, the measurement result includes a measurement report related to a beam of the first terminal device.

Optionally, the notification message further includes one or more of the following information: cell list information and beam list information for receiving the first multicast service.

According to a seventh aspect, a communications method is provided. For example, the communications method may be performed by a first access network node, or may be performed by a component (such as a circuit or a chip) in the first access network node. This is not limited in this application.

Specifically, the first access network node receives a third message from a multicast control function node, where the third message is used to request to establish a first radio bearer, the third message includes a second indication, and the second indication indicates that the first radio bearer carries a first multicast service. The first access network node receives a notification message from the multicast control function node, where the notification message is used to indicate a transmission mode in which a second access network node sends a data packet of the first multicast service, and the transmission mode includes a unicast mode and/or a multicast mode. Therefore, the multicast control function node is introduced, and the multicast control function node determines the transmission mode, so that a multicast service can be transmitted in a CU-DU architecture.

In a possible implementation, the method further includes: The first access network node sends a measurement result of a first terminal device to the multicast control function node, where the measurement result is used to determine the transmission mode. Herein, the first access network node reports the measurement result to the multicast control function node, so that the multicast control function node can determine the transmission mode with reference to the measurement result. This can ensure/improve service transmission quality while saving resources, thereby optimizing experience of each user. Quality of a service received by a terminal device has a corresponding quality requirement. The quality requirement may be determined by a core network device or a higher layer device. Specifically, if the signal quality is relatively good, the multicast control function node may determine that the transmission mode is the multicast mode. If the signal quality is average, the multicast control function node may determine that the transmission mode is the unicast mode, or the multicast mode and the unicast mode. This improves service transmission quality, and improves experience of each user.

Optionally, the measurement result includes a measurement report related to a beam of the first terminal device.

Optionally, the notification message further includes one or more of the following information: cell list information and beam list information for receiving the first multicast service.

According to an eighth aspect, a communications method is provided. For example, the communications method may be performed by a multicast control function node, or may be performed by a component (such as a circuit or a chip) in the multicast control function node. This is not limited in this application.

Specifically, the multicast control function node receives an eighth message from a core network node, where the eighth message is used to request to establish a first radio bearer, the eighth message includes a fourth indication, and the fourth indication indicates that the first radio bearer carries a first multicast service. Then, the multicast control function node sends a third message to a third access network node, where the third message is used to request to establish the first radio bearer, the third message includes a second indication, and the second indication indicates that the first radio bearer carries the first multicast service. Finally, the multicast control function node sends a notification message to the third access network node, where the notification message is used to indicate a transmission mode in which a second access network node sends a data packet of the first multicast service, and the transmission mode includes a unicast mode and/or a multicast mode. Therefore, the multicast control function node is introduced, and the multicast control function node determines the transmission mode, so that a multicast service can be transmitted in a CU-CP-CU-UP architecture.

In a possible implementation, the transmission mode is determined based on a measurement result of a first terminal device. Herein, the multicast control function node may determine the transmission mode with reference to the measurement result. This can ensure/improve service transmission quality while saving resources, thereby optimizing experience of each user. Quality of a service received by a terminal device has a corresponding quality requirement. The quality requirement may be determined by a core network device or a higher layer device. Specifically, if the signal quality is relatively good, the multicast control function node may determine that the transmission mode is the multicast mode. If the signal quality is average, the multicast control function node may determine that the transmission mode is the unicast mode, or the multicast mode and the unicast mode. This improves service transmission quality, and improves experience of each user.

Optionally, the measurement result includes a measurement report related to a beam of the first terminal device.

Optionally, the notification message further includes one or more of the following information: cell list information and beam list information for receiving the first multicast service.

According to a ninth aspect, a communications method is provided. For example, the communications method may be performed by a third access network node, or may be performed by a component (such as a circuit or a chip) in the third access network node. This is not limited in this application.

Specifically, the third access network node receives a third message sent by a multicast control function node, where the third message is used to request to establish a first radio bearer, the third message includes a second indication, and the second indication indicates that the first radio bearer carries a first multicast service. Then, the third access network node receives a notification message from the multicast control function node, where the notification message is used to indicate a transmission mode in which a second access network node sends a data packet of the first multicast service, and the transmission mode includes a unicast mode and/or a multicast mode. Therefore, the multicast control function node is introduced, and the multicast control function node determines the transmission mode, so that a multicast service can be transmitted in a CU-CP-CU-UP architecture.

In a possible implementation, the method further includes: The third access network node sends a measurement result of a first terminal device to the multicast control function node, where the measurement result is used to determine the transmission mode. Herein, the third access network node reports the measurement result to the multicast control function node, so that the multicast control function node can determine the transmission mode with reference to the measurement result. This can ensure/improve service transmission quality while saving resources, thereby optimizing experience of each user. Quality of a service received by a terminal device has a corresponding quality requirement. The quality requirement may be determined by a core network device or a higher layer device. Specifically, if the signal quality is relatively good, the multicast control function node may determine that the transmission mode is the multicast mode. If the signal quality is average, the multicast control function node may determine that the transmission mode is the unicast mode, or the multicast mode and the unicast mode. This improves service transmission quality, and improves experience of each user.

Optionally, the measurement result includes a measurement report related to a beam of the first terminal device.

Optionally, the notification message further includes one or more of the following information: cell list information and beam list information for receiving the first multicast service.

According to a tenth aspect, a communications apparatus is provided, including modules or units configured to perform the method in any possible implementation of the first aspect, or modules or units configured to perform the method in any possible implementation of the second aspect, or modules or units configured to perform the method in any possible implementation of the third aspect, or modules or units configured to perform the method in any possible implementation of the fourth aspect, or modules or units configured to perform the method in any possible implementation of the fifth aspect, or modules or units configured to perform the method in any possible implementation of the sixth aspect, or modules or units configured to perform the method in any possible implementation of the seventh aspect, or modules or units configured to perform the method in any possible implementation of the eighth aspect, or modules or units configured to perform the method in any possible implementation of the ninth aspect.

According to an eleventh aspect, a communications apparatus is provided, including at least one processor and a communications interface. The at least one processor is coupled to the communications interface, the communications interface is configured to obtain a program or an instruction, and when the program or the instruction is executed by the processor, to implement the method in any possible implementation of the first aspect or the seventh aspect.

In an implementation, the communications apparatus is a first access network node. When the communications apparatus is the first access network node, the communications interface may be a transceiver or an input/output interface.

In another implementation, the communications apparatus is a chip disposed in the first access network node. When the communications apparatus is the chip disposed in the first access network node, the communications interface may be an input/output interface.

Optionally, the communications interface may be a transceiver circuit. Optionally, the input/output interface may be an input/output circuit.

Optionally, the communications apparatus further includes a memory. The processor is coupled to the memory, and may be configured to execute instructions in the memory. There may be one or more memories. Optionally, the memory may be integrated into the processor, or the memory and the processor are separately disposed.

In a specific implementation process, the memory may be a non-transitory (non-transitory) memory, for example, a read-only memory (read-only memory, ROM). The memory and the processor may be integrated into a same chip, or may be separately disposed in different chips. A type of the memory and a manner of disposing the memory and the processor are not limited in this embodiment of this application.

According to a twelfth aspect, a communications apparatus is provided, including at least one processor and a communications interface. The at least one processor is coupled to the communications interface, the communications interface is configured to obtain a program or an instruction, and when the program or the instruction is executed by the processor, to implement the method in any possible implementation of the second aspect or the fifth aspect.

In an implementation, the communications apparatus is a second access network node. When the communications apparatus is the second access network node, the communications interface may be a transceiver or an input/output interface.

In another implementation, the communications apparatus is a chip disposed in the second access network node. When the communications apparatus is the chip disposed in the second access network node, the communications interface may be an input/output interface.

Optionally, the communications interface may be a transceiver circuit. Optionally, the input/output interface may be an input/output circuit.

Optionally, the communications apparatus further includes a memory. The processor is coupled to the memory, and may be configured to execute instructions in the memory. There may be one or more memories. Optionally, the memory may be integrated into the processor, or the memory and the processor are separately disposed.

In a specific implementation process, the memory may be a non-transitory memory, for example, a read-only memory ROM. The memory and the processor may be integrated into a same chip, or may be separately disposed in different chips. A type of the memory and a manner of disposing the memory and the processor are not limited in this embodiment of this application.

According to a thirteenth aspect, a communications apparatus is provided, including at least one processor and a communications interface. The at least one processor is coupled to the communications interface, the communications interface is configured to obtain a program or an instruction, and when the program or the instruction is executed by the processor, to implement the method in any possible implementation of the third aspect or the ninth aspect.

In an implementation, the communications apparatus is a third access network node. When the communications apparatus is the third access network node, the communications interface may be a transceiver or an input/output interface.

In another implementation, the communications apparatus is a chip disposed in the third access network node. When the communications apparatus is the chip disposed in the third access network node, the communications interface may be an input/output interface.

Optionally, the communications interface may be a transceiver circuit. Optionally, the input/output interface may be an input/output circuit.

Optionally, the communications apparatus further includes a memory. The processor is coupled to the memory, and may be configured to execute instructions in the memory. There may be one or more memories. Optionally, the memory may be integrated into the processor, or the memory and the processor are separately disposed.

In a specific implementation process, the memory may be a non-transitory memory, for example, a read-only memory ROM. The memory and the processor may be integrated into a same chip, or may be separately disposed in different chips. A type of the memory and a manner of disposing the memory and the processor are not limited in this embodiment of this application.

According to a fourteenth aspect, a communications apparatus is provided, including at least one processor and a communications interface. The at least one processor is coupled to the communications interface, the communications interface is configured to obtain a program or an instruction, and when the program or the instruction is executed by the processor, to implement the method in any possible implementation of the fourth aspect.

In an implementation, the communications apparatus is a fourth access network node. When the communications apparatus is the fourth access network node, the communications interface may be a transceiver or an input/output interface.

In another implementation, the communications apparatus is a chip disposed in the fourth access network node. When the communications apparatus is the chip disposed in the fourth access network node, the communications interface may be an input/output interface.

Optionally, the communications interface may be a transceiver circuit. Optionally, the input/output interface may be an input/output circuit.

Optionally, the communications apparatus further includes a memory. The processor is coupled to the memory, and may be configured to execute instructions in the memory. There may be one or more memories. Optionally, the memory may be integrated into the processor, or the memory and the processor are separately disposed.

In a specific implementation process, the memory may be a non-transitory memory, for example, a read-only memory ROM. The memory and the processor may be integrated into a same chip, or may be separately disposed in different chips. A type of the memory and a manner of disposing the memory and the processor are not limited in this embodiment of this application.

According to a fifteenth aspect, a communications apparatus is provided, including at least one processor and a communications interface. The at least one processor is coupled to the communications interface, the communications interface is configured to obtain a program or an instruction, and when the program or the instruction is executed by the processor, to implement the method in any possible implementation of the sixth aspect.

In an implementation, the communications apparatus is a multicast control function node. When the communications apparatus is the multicast control function node, the communications interface may be a transceiver or an input/output interface.

In another implementation, the communications apparatus is a chip disposed in the multicast control function node. When the communications apparatus is the chip disposed in the multicast control function node, the communications interface may be an input/output interface.

Optionally, the communications interface may be a transceiver circuit. Optionally, the input/output interface may be an input/output circuit.

Optionally, the communications apparatus further includes a memory. The processor is coupled to the memory, and may be configured to execute instructions in the memory. There may be one or more memories. Optionally, the memory may be integrated into the processor, or the memory and the processor are separately disposed.

In a specific implementation process, the memory may be a non-transitory memory, for example, a read-only memory ROM. The memory and the processor may be integrated into a same chip, or may be separately disposed in different chips. A type of the memory and a manner of disposing the memory and the processor are not limited in this embodiment of this application.

According to a sixteenth aspect, a processor is provided, including an input circuit, an output circuit, and a processing circuit. The processing circuit is configured to: receive a signal by using the input circuit, and transmit a signal by using the output circuit, so that the processor performs the method in any possible implementation of the first aspect to the ninth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, and a signal output by the output circuit may be output to, for example, but not limited to, a transmitter and transmitted by the transmitter. The input circuit and the output circuit may be a same circuit, and the circuit is used as the input circuit and the output circuit at different moments. Specific implementations of the processor and the various circuits are not limited in this embodiment of this application.

According to a seventeenth aspect, an apparatus is provided, including a processor and a memory. The processor is configured to: read instructions stored in the memory, receive a signal by using a receiver, and transmit a signal by using a transmitter, to perform the method in any possible implementation of the first aspect to the ninth aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory ROM. The memory and the processor may be integrated into a same chip, or may be separately disposed in different chips. A type of the memory and a manner of disposing the memory and the processor are not limited in this embodiment of this application.

It should be understood that a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The apparatus in the seventeenth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently of the processor.

According to an eighteenth aspect, a computer program product is provided. The computer program product includes a computer program (which may also be referred to as code or instructions). When the computer program is run, a computer is enabled to perform the method in any possible implementation of the first aspect to the ninth aspect.

According to a nineteenth aspect, a computer-readable medium is provided. The computer-readable medium stores a computer program (also referred to as code or instructions). When the computer program is run on a computer, the computer is enabled to perform the method in any possible implementation of the first aspect to the ninth aspect.

According to a twentieth aspect, a communications system is provided, including the first access network node and the second access network node described above.

According to a twenty-first aspect, a communications system is provided, including the third access network node, the fourth access network node, and the second access network node described above.

According to a twenty-second aspect, a communications system is provided, including the first access network node and the multicast control function node described above.

According to a twenty-third aspect, a communications system is provided, including the third access network node and the multicast control function node described above.

BRIEF DESCRIPTION OF DRAWINGS

FIG. 16 is a schematic diagram of an example of another communications method according to an embodiment of this application:

FIG. 17 is a schematic diagram of another example of another communications method according to an embodiment of this application:

DESCRIPTION OF EMBODIMENTS

The following describes technical solutions of this application with reference to accompanying drawings.

The technical solutions in embodiments of this application may be applied to various communications systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, and a 5th generation (5th generation, 5G) system or a new radio (new radio, NR) system.

Figure 1:
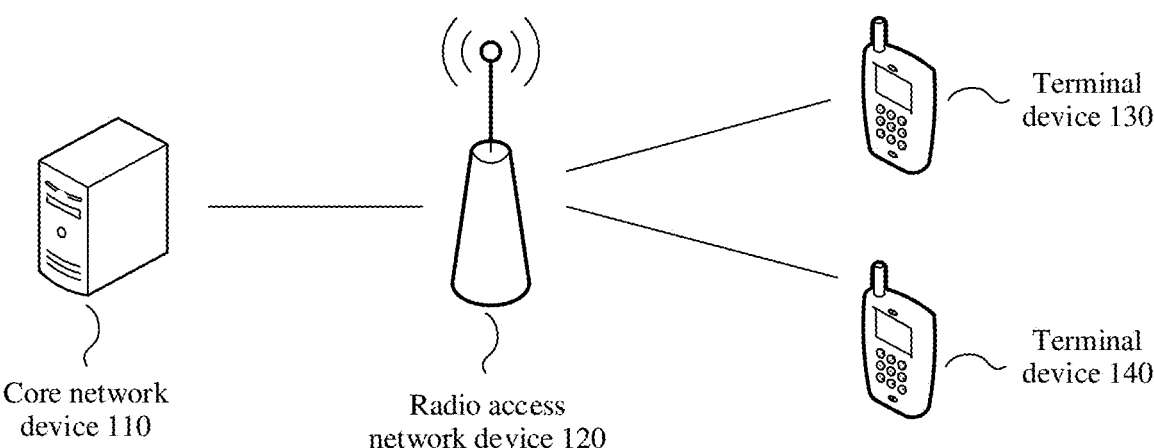
FIG. 1 is a schematic diagram of an architecture of a mobile communications system to which an embodiment of this application is applied.

FIG. 1 is a schematic diagram of an architecture of a mobile communications system to which an embodiment of this application is applied. As shown in FIG. 1, the mobile communications system includes a core network device 110, an access network device 120, and at least one terminal device (a terminal device 130 and a terminal device 140 shown in FIG. 1). The terminal device is connected to the access network device in a wireless manner, and the access network device is connected to the core network device in a wireless or wired manner. The core network device and the access network device may be different physical devices that are independent of each other, or functions of the core network device and logical functions of the access network device may be integrated into a same physical device, or some functions of the core network device and some functions of the access network device may be integrated into one physical device. The terminal device may be at a fixed location, or may be mobile. FIG. 1 is merely a schematic diagram. The communications system may further include other network devices, for example, a wireless relay device and a wireless backhaul device, which are not drawn in FIG. 1. Quantities of core network devices, radio access network devices, and terminal devices included in the mobile communications system are not limited in embodiments of this application.

Different access networks may use different access technologies. Currently, there are two types of radio access technologies: a 3rd Generation Partnership Project (3rd Generation Partnership Project, 3GPP) access technology (for example, a radio access technology used in a 3G, 4G, or 5G system) and a non-3GPP (non-3GPP) access technology. The 3GPP access technology is an access technology that complies with a 3GPP standard specification. An access network using the 3GPP access technology is referred to as a radio access network (radio access network, RAN), and an access network device in a 5G system is referred to as a next-generation NodeB (next generation NodeB, gNB). The non-3GPP access technology is an access technology that does not comply with the 3GPP standard specification, for example, an air interface technology represented by an access point (access point, AP) in Wi-Fi. An access network that implements a network access function by using a wireless communications technology may be referred to as a radio access network RAN. A 5G radio access network in 3GPP may be referred to as a next-generation radio access network (next generation radio access network, NG-RAN).

The access network device is an access device used by the terminal device to access the mobile communications system in a wireless manner. The access network device may be a radio access network RAN device, a NodeB (NodeB), an evolved NodeB (evolved NodeB, eNB), a next-generation NodeB gNB in a 5G mobile communications system, a transmission point, a base station in a future mobile communications system or an access node in a wireless fidelity (wireless fidelity, Wi-Fi) system, or one or a group of (including a plurality of antenna panels) antenna panels of the gNB in the 5G system, or may be a network node forming the gNB or the transmission point, for example, a baseband unit (baseband unit, BBU) or a distributed unit (distributed unit, DU). A specific technology and a specific device form used for the access network device are not limited in embodiments of this application. In some deployments, the gNB may include a central unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and service, to implement functions of a radio resource control (radio resource control, RRC) layer and a packet data convergence protocol (packet data convergence protocol, PDCP) layer. The DU is responsible for processing a physical layer protocol and a real-time service, to implement functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network, or the CU may be classified into a network device in a core network (core network, CN). This is not limited in this application.

The terminal device may also be referred to as a terminal (Terminal), user equipment (user equipment, UE), a mobile station (mobile station, MS), a mobile terminal (mobile terminal, MT), or the like. The terminal device may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like.

The access network device and the terminal device may be deployed on land, and include an indoor or outdoor device, a handheld device, or a vehicle-mounted device: or may be deployed on water: or may be deployed on a plane, a balloon, and a satellite in air. Application scenarios of the radio access network device and the terminal device are not limited in embodiments of this application.

Embodiments of this application are applicable to downlink signal transmission, or are applicable to uplink signal transmission, or are applicable to device-to-device (device-to-device, D2D) signal transmission. For the downlink signal transmission, a sending device is a radio access network device, and correspondingly a receiving device is a terminal device. For the uplink signal transmission, a sending device is a terminal device, and correspondingly a receiving device is a radio access network device. For the D2D signal transmission, a sending device is a terminal device, and correspondingly a receiving device is also a terminal device. A signal transmission direction is not limited in embodiments of this application.

Communication between the access network device and the terminal device and communication between the terminal devices may be performed by using a licensed spectrum (licensed spectrum), an unlicensed spectrum (unlicensed spectrum), or both a licensed spectrum and an unlicensed spectrum. Communication between the access network device and the terminal device and communication between the terminal devices may be performed by using a spectrum below 6 gigahertz (gigahertz, GHz), a spectrum above 6G, or both a spectrum below 6G and a spectrum above 6G. Spectrum resources used between the access network device and the terminal device are not limited in embodiments of this application.

In embodiments of this application, a communications apparatus (for example, an access network node or a multicast control function node) includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by a communications apparatus, or a function module that is in the communications apparatus and that can invoke and execute the program.

In addition, various aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include, and/or carry instructions and/or data.

It should be understood that the communications system in FIG. 1 is merely described as an example, and constitutes no limitation on the protection scope of embodiments of this application. The technical solutions in embodiments of this application may also be applied to another communication system.

Figure 2:
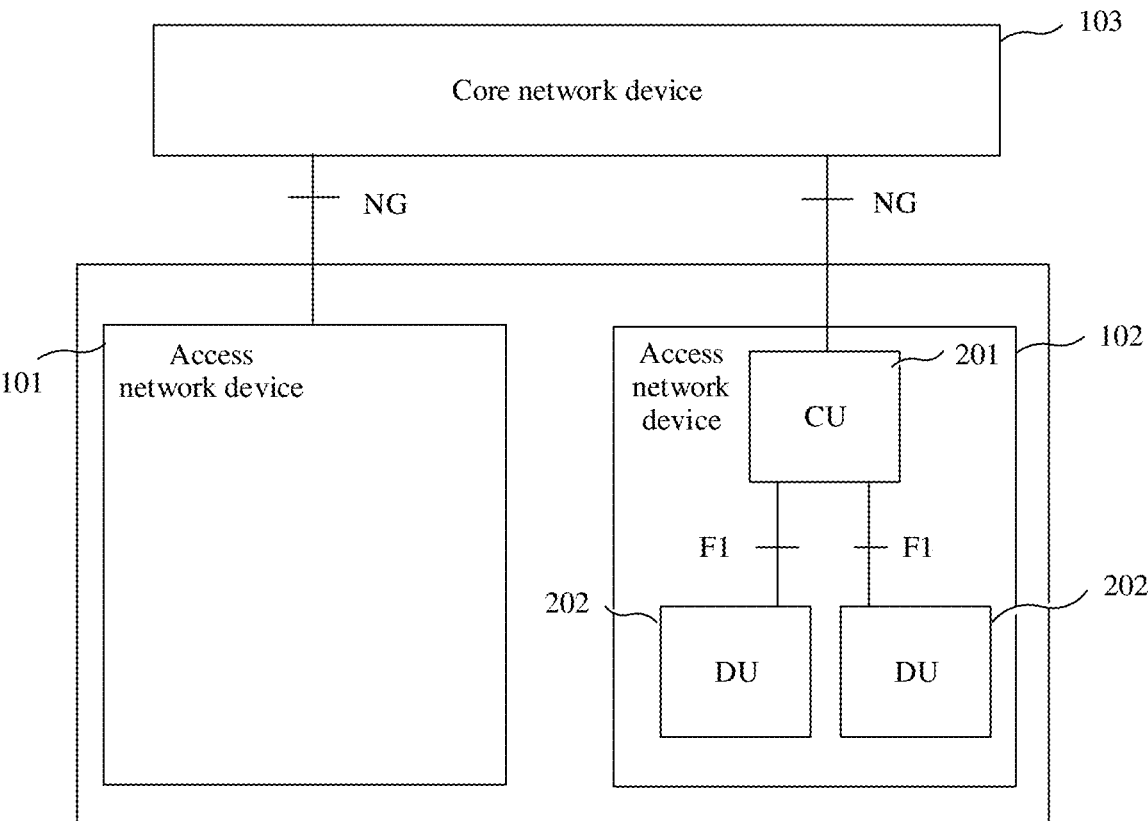
FIG. 2 is a diagram of another communications architecture to which an embodiment of this application is applied.

FIG. 2 is a diagram of another communications architecture to which an embodiment of this application is applied. As shown in FIG. 2, a core network device 103, for example, a 5th-generation core network (the 5th generation core network, 5GC), may be connected to a complete access network device 101, for example, a gNB, or may be connected to an access network device 102 including a central unit (Centralized Unit, CU) 201 and a distributed unit (Distributed Unit, DU) 202. It may be understood that the CU 201 and the DU 202 may be physical entities, or may be software-based or virtualized units. It may be further understood that the CU 201 and the DU 202 may be deployed on a same device, or may be deployed on different devices. This is not limited.

The CU 201 and the DU 202 may be software-based or virtualized units, or may be physical entities. Radio access network functions that need to be flexibly combined run in the CU 201, for example, higher-layer functions such as a service data adaptation protocol (service data adaptation protocol, SDAP) layer, a packet data convergence protocol PDCP layer, and a radio resource control RRC layer. RAN functions that are closely related to hardware and have a relatively high real-time requirement run in the DU 202, for example, bottom-layer functions such as a radio link control (radio link control, RLC) layer, a physical layer (physical layer, PHY), and a media access control (media access control, MAC) layer.

The CU 201 and the DU 202 are connected to each other through a communications interface. The CU 201 and the core network device are also connected to each other through a communications interface. In this embodiment of this application, the communications interface between the CU 201 and the DU 202 may be referred to as an F1 interface. The interface between the CU 201 and the core network device may be referred to as an N2 interface or an NG interface. As shown in FIG. 2, one access network device 102 may include one CU 201 and one or more DUs 202. The CU 201 and the DU 202 are connected to each other through an F1 interface. One DU 202 can be connected to only one CU 201, and one CU 201 may be connected to one or more DUs 202.

For example, the access network device 102 is a gNB. The gNB may include one or more gNB-DUs and one gNB-CU. One gNB-DU is connected to one gNB-CU, and one gNB-CU may be connected to a plurality of gNB-DUs. The gNB-CU and the gNB-DUs connected to the gNB-CU are considered as one gNB for other gNBs and 5GCs.

Figure 3:
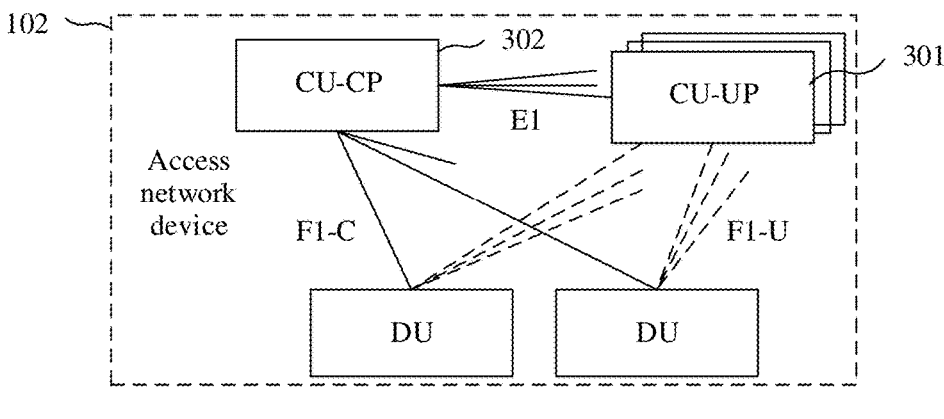
FIG. 3 is a diagram of still another communications architecture to which an embodiment of this application is applied.

FIG. 3 provides a new architecture based on the architecture in FIG. 2. To be specific, a CU includes a central unit-user plane (centralized unit-user plane, CU-UP) 301 and a central unit-control plane (centralized unit-control plane, CU-CP) 302. The CU-UP 301 and the CU-CP 302 may be on different physical devices. There may be an open interface between the CU-UP 301 and the CU-CP 302, and the interface may be referred to as an E1 interface. In addition, there may be an interface between a DU and each of the CU-UP 301 and the CU-CP 302. For example, an interface between the CU-CP 302 and the DU is an F1-C interface, and an interface between the CU-UP 301 and the DU is an F1-U interface.

The architecture in FIG. 3 may have the following features: One access network device 102 may include one CU-CP 302, one or more CU-UPs 302, and a plurality of DUs. One DU may be connected to one CU-CP 302. One CU-UP 301 may be connected to only one CU-CP 302. One DU may be connected to a plurality of CU-UPs 301 under the control of a same CU-CP 302. One CU-UP 301 may be connected to a plurality of DUs under the control of a same CU-CP 302.

For example, the access network device 102 is a gNB. One gNB-DU and one gNB-CU-UP each are connected to only one gNB-CU-CP. Under the control of a same gNB-CU-CP, one gNB-DU may be connected to a plurality of gNB-CU-UPs, and one gNB-CU-UP may be connected to a plurality of gNB-DUs.

The foregoing access network device (including the CU, the DU, the CU-CP, or the CU-UP in the access network device) may also be referred to as an access network node, an access network entity, or the like.

Currently, how to transmit a multicast service in a CU-DU split scenario is not considered. This application provides a communications method, to transmit a multicast service in a CU-DU split architecture. This helps improve network performance. In addition, this application further provides a communications method, to transmit a multicast service in a CU-CP-CU-UP split architecture.

It may be understood that the CU-DU split architecture mainly includes split of a layer of a protocol stack, for example, split of a PDCP layer, split of an RLC layer, and split of a MAC layer. This is not specifically limited. Embodiments of this application are applicable to split of all layers of the protocol stack.

Figure 4:
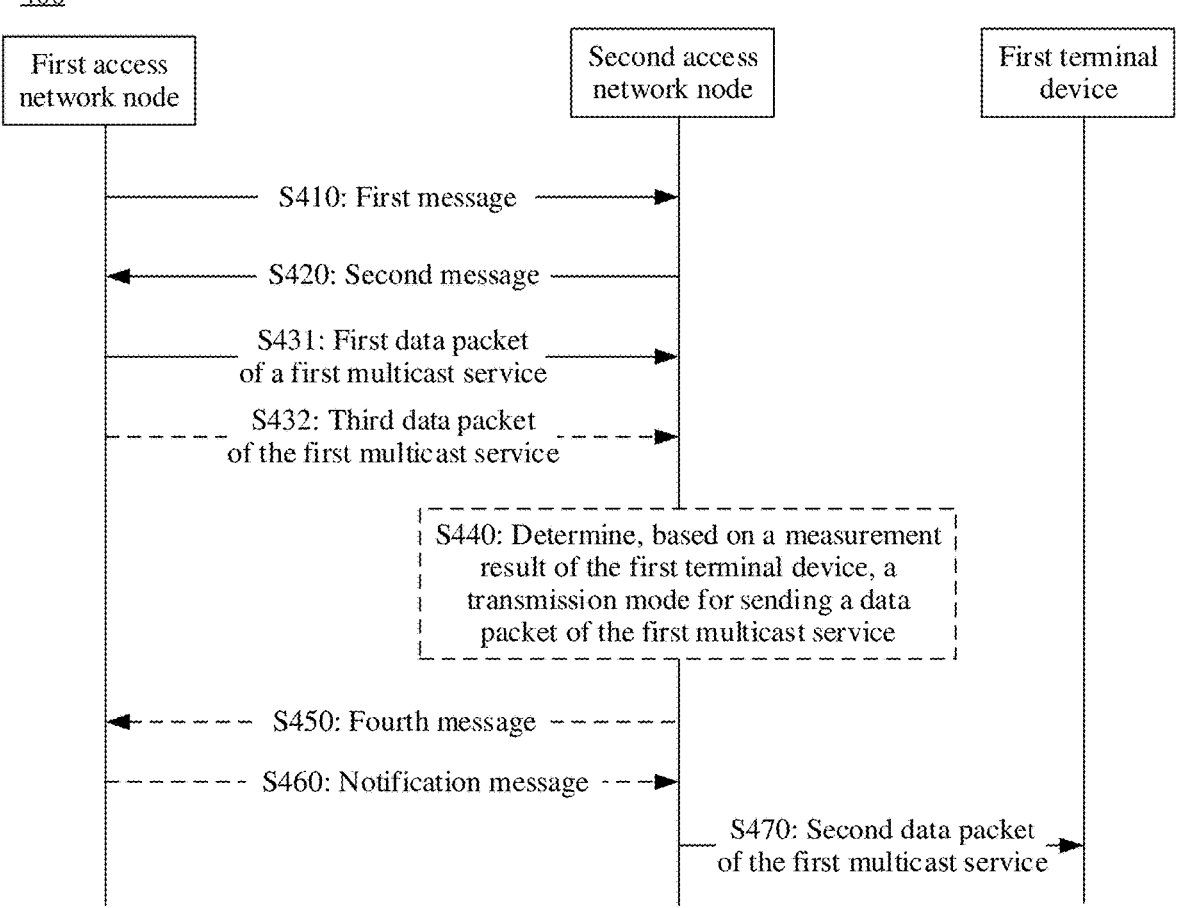
FIG. 4 is a schematic interaction diagram of a communications method according to an embodiment of this application.

FIG. 4 is a schematic interaction diagram of a communications method 400 according to an embodiment of this application. It may be understood that some or all information exchanged between a first access network node and a second access network node in FIG. 4 may be carried in an existing message, channel, signal, or signaling, or may be carried in a newly defined message, channel, signal, or signaling. This is not specifically limited. For example, some or all information exchanged between the first access network node and the second access network node may be carried in an existing F1 interface message, or may be carried in a newly defined F1 interface message. It may be understood that an F1 interface is merely used as an example for description herein, but does not constitute a limitation on this embodiment of this application. Actually, an interface between a CU and a DU in another split architecture may also be used herein. As shown in FIG. 4, the method 400 includes the following steps.

S410: The first access network node sends a first message to the second access network node, where the first message is used to request to establish a first radio bearer, the first message includes a first indication, and the first indication indicates that the first radio bearer carries a first multicast service. Correspondingly, the second access network node receives the first message.

The first access network node and the second access network node correspond to different functions in the central unit-distributed unit split architecture. For example, the first access network node is a node or an entity corresponding to the central unit, and the second access network node is a node or an entity corresponding to the distributed unit.

The first message is used to request to establish a radio bearer, that is, the first radio bearer, for the first multicast service. The first indication indicates that the first multicast service is subsequently transmitted on the first radio bearer.

The first message is a message exchanged between the first access network node and the second access network node, that is, a message between the central unit and the distributed unit. The first message may be transmitted through the F1 interface.

The first indication may be used for explicit indication, or may be used for implicit indication. This is not specifically limited. The following provides description by using examples.

For example, when being used for explicit indication, the first indication explicitly indicates that a to-be-transmitted service flow is a multicast service flow (for example, a multicast service flow) or a multicast service. In a possible implementation, the first indication may be an information element (information element, IE) or a field, that is, the first indication explicitly indicates, by using the IE or the field, that a service is a multicast service or a multicast service flow. An attribute of the IE or the field may be an enumeration (ENUMERATED {XXX}) type, for example, {true/false} may be enumerated, or enumeration may not be used. This is not specifically limited in this embodiment.

For another example, when being used for implicit indication, the first indication includes a multicast service flow or identifier, that is, indicates that a service flow is a multicast service flow or a multicast service. After receiving the first indication, the second access network node may learn, based on content included in the first indication, that a service is a multicast service or a multicast service flow. For example, in the CU-DU split architecture, the first access network node may be a CU, and the second access network node may be a DU.

The first radio bearer (radio bearer, RB) is used to carry the first multicast service. Specifically, in the CU-DU architecture, data and/or signaling from the CU to the DU and data and/or signaling from the DU to UE are carried in the first radio bearer. The first radio bearer may be referred to as a multicast radio bearer or a dual cast radio bearer (dual cast RB)/multicast radio bearer. It may be understood that a specific name of the first radio bearer is not limited herein. There may be another name in the future, but the first radio bearer is essentially used to carry data and/or signaling of a multicast service. For unified description herein, the multicast service may also be referred to as a multicast service, but a specific name is not limited. For example, the first multicast service may be a multicast broadcast service (multicast broadcast service, MBS).

Optionally, before S410, the method 400 further includes: A core network node or a multicast control function node sends a third message to the first access network node, where the third message includes a second indication, and the second indication indicates the first multicast service.

The third message is used by the core network node or the multicast control function node to notify the first access network node of information about the first multicast service. The second indication indicates that a service that needs to be subsequently transmitted is a multicast service, for example, the first multicast service.

The second indication may be used for explicit indication, or may be used for implicit indication. This is not specifically limited. The following provides description by using examples.

For example, when being used for explicit indication, the second indication explicitly indicates that a service flow for the first multicast service is a multicast service flow (for example, a multicast service flow) or a multicast service. In a possible implementation, the second indication may be an information element IE or a field, that is, the second indication explicitly indicates, by using the IE or the field, that a service is a multicast service or a multicast service flow. An attribute of the IE or the field may be an enumeration (ENUMERATED {XXX}) type, for example, {true/false} may be enumerated, or enumeration may not be used. This is not specifically limited in this embodiment. For another example, when being used for implicit indication, the second indication includes a multicast service flow or identifier. If the second indication received by the first access network node includes the multicast service flow or identifier, it indicates that the service is a multicast service.

Herein, the first access network node may receive the third message from the core network node or the multicast control function node, where the second indication included in the third message indicates the first multicast service.

For example, the core network node is used as an example. When the core network node delivers a multicast service, the second indication received by the first access network node indicates that a QoS flow for the delivered service is the multicast service.

It may be understood that, in addition to the second indication, the third message may further include other information. Optionally, the third message further includes a multicast security parameter (security parameter), and the multicast security parameter includes but is not limited to a security key and/or a security algorithm. Further, security activation may be performed by using the multicast security parameter, to ensure security of a user and a network device, prevent data from being eavesdropped and/or tampered with, improve communication security, ensure network security, and ensure user rights.

It may be understood that an example in which the multicast security parameter includes the security key and/or the security algorithm is used for description herein, but this application is not limited thereto. This is not specifically limited.

The first access network node learns, based on the second indication, that the received service is the multicast service. The first access network node (or an SDAP layer of the first access network node) may map the first multicast service to the first radio bearer. If the third message includes the multicast security parameter, a PDCP layer of the first access network node that corresponds to the first radio bearer encrypts a multicast data packet/PDU session. For a specific encryption process, refer to descriptions of integrity protection and/or encryption (integrity protection and/or ciphering) in the protocol.

The first access network node sends the first message to the second access network node, to request the second access network node to establish the first radio bearer, or request the second access network node to establish a downlink tunnel for transmitting the first multicast service. Alternatively, the first message may be understood as that the first access network node notifies the second access network node that the first radio bearer is a multicast radio bearer, that is, the first radio bearer is used to carry the first multicast service.

After receiving the first message, the second access network node provides a downlink tunnel for the first radio bearer, or establishes a downlink user plane tunnel (which may be referred to as a multicast tunnel) used to receive a data packet of the first multicast service. In other words, in response to the first message, the second access network node provides the downlink user plane tunnel for the first radio bearer, or establishes the downlink user plane tunnel used to receive the data packet of the first multicast service. In other words, the second access node may establish the downlink user plane tunnel for the first radio bearer between the first access network node and the second access network node. The downlink user plane tunnel is a tunnel used to transmit data on a user plane. For example, the downlink user plane tunnel is a GTP-U tunnel, and the GTP-U tunnel is used to transmit the data packet of the first multicast service. The second access network node may send information about the established downlink user plane tunnel to the first access network node.

S420: The second access network node sends a second message to the first access network node, where the second message includes first transport layer information corresponding to the first radio bearer. Correspondingly, the first access network node receives the second message.

The second message is a message exchanged between the first access network node and the second access network node, that is, a message between the central unit and the distributed unit. The second message may be transmitted through the F1 interface.

The second message is used to notify the first access network node of tunnel-related information (for example, an address and a tunnel identifier). A tunnel includes the downlink user plane tunnel established between the second access network node and the first access network node. The first transport layer information is used by the first access network node to determine the downlink user plane tunnel established between the second access network node and the first access network node, so that the first access network node can transmit the data packet of the first multicast service through the downlink user plane tunnel.

The first transport layer information may be user plane transport layer information (UP transport layer information). For specific descriptions of the user plane transport layer information, refer to descriptions in the standard.

Optionally, the first transport layer information includes information about a first user plane address. The first user plane address is address information of the downlink user plane tunnel. The first user plane address corresponds to the downlink user plane tunnel established by the second access network node to transmit the first multicast service. The first user plane address is an address of the downlink user plane tunnel. As described above, the downlink user plane tunnel is used to transmit the data packet of the first multicast service. For example, the first transport layer information includes an endpoint IP address (Endpoint IP Address) and a tunnel endpoint identifier GTP-TEID.

The first transport layer information corresponding to the first radio bearer may include: The first radio bearer corresponds to one first user plane address, or corresponds to a plurality of first user plane addresses. A plurality of terminal devices may share the downlink user plane tunnel. The first access network node can transmit, to the second access network node on the established downlink user plane tunnel, the data packet of the first multicast service that is received from the core network node or the multicast control function node.

Figure 5:
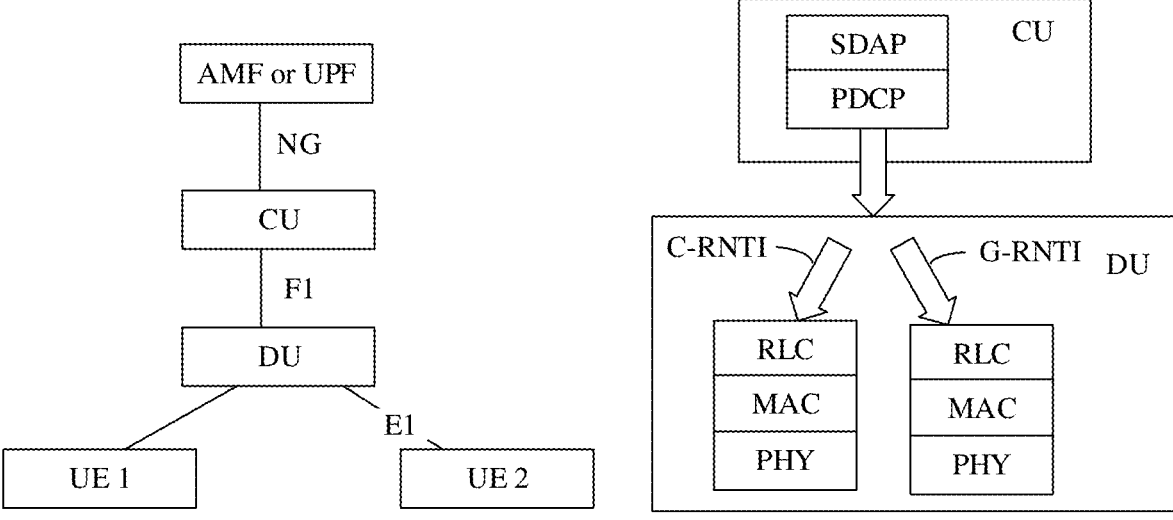
FIG. 5 is a schematic diagram of an example of a communications method according to an embodiment of this application.

FIG. 5 is used as an example for description. It is assumed that the first access network node is a CU, and the second access network node is a DU. In this case, a user plane tunnel is established between the CU and the DU, and the tunnel is used to transmit a data packet transmitted in a unicast mode and a multicast mode. An architecture is shown in the left figure in FIG. 5. The core network node (for example, an AMF or a UPF) is connected to the CU through an NG interface, the CU is connected to the DU through an F1 interface, and the DU is connected to UE (for example, UE 1 or UE 2) through an E1 interface. A processing process of a data packet in a protocol stack is shown in the right figure in FIG. 5. A user plane protocol stack of the CU includes an SDAP layer and a PDCP layer. Related processing such as sorting and encryption is performed on the data packet of the first multicast service by using one PDCP layer in the CU. In FIG. 5, the data packet is processed by using one PDCP layer. For the first multicast service, access stratum security (AS security) activation is performed, by using a same parameter/key, on a data packet that is transmitted in a unicast mode and that is scrambled by using a C-RNTI and a data packet that is transmitted in a multicast mode and that is scrambled by using a G-RNTI (the G-RNTI is an RNTI corresponding to a multicast service), or access stratum security activation is not performed. Herein, whether to perform access stratum security activation may be specifically determined based on a configuration in the third message. It may be understood that the G-RNTI is used as an example herein to describe the RNTI corresponding to the multicast service, but this application is not limited thereto. The G-RNTI may be replaced with another identifier or name, and is essentially used to scramble related downlink control information (downlink control information, DCI) of the multicast service, for example, configuration information, scheduling information, or a data packet of the multicast service.

S431: The first access network node sends a first data packet of the first multicast service to the second access network node based on the first transport layer information. Correspondingly, the second access network node receives the first data packet of the first multicast service based on the first transport layer information.

Optionally, the first access network node may duplicate the data packet of the first multicast service that is received from the core network node, to obtain two data packets. Optionally, the first access network node may add indication information to each data packet, and the indication information indicates that data is sent to a first terminal device in a multicast or unicast transmission mode. Herein, the two data packets are transmitted to the second access network node through a same downlink tunnel.

Optionally, the first access network node does not need to duplicate the data packet, but the second access network node duplicates the data packet to obtain two data packets. The first access network node sends one multicast data packet to the second access network node through a tunnel corresponding to a first downlink user plane address. The second access network node duplicates the multicast data packet to obtain two data packets, and separately distributes the two data packets to a multicast logical channel and a unicast logical channel. The multicast logical channel is used to transmit a data packet transmitted in a multicast mode, and the unicast logical channel is used to transmit a data packet transmitted in a unicast mode.

S470: The second access network node sends a second data packet of the first multicast service to the first terminal device by using the first radio bearer.

The second data packet is a data packet of the first multicast service that is sent by the second access network node to the first terminal device. The first data packet is a data packet sent by the first access network node to the second access network node.

It may be understood that the first data packet may be the same as or different from the second data packet. This is not limited. When the second data packet is the same as the first data packet, the second data packet may be a data packet obtained by the first access network node by duplicating (duplication) the first data packet at the PDCP layer.

For example, the first data packet and the second data packet are data packets of a same multicast service, that is, both are data packets of the first multicast service. For a same service, a payload (payload) of the first data packet is the same as a payload (payload) of the second data packet. In addition, because a transmit/receive end of the first data packet is different from a transmit/receive end of the second data packet, a header of the first data packet is different from a header of the second data packet.

This embodiment of this application may be applied to a CU-DU architecture. The first access network node may be a CU, and the second network node may be a DU. In this embodiment of this application, the first radio bearer is introduced to carry the multicast service on the F1 interface, so that data of the multicast service can be transmitted on the F1 interface. In addition, a tunnel is established between the CU and the DU, to transmit the multicast service on the F1 interface. For unified description herein, the F1 interface in this embodiment of this application may be extended to an interface in another split architecture, or may evolve into a logical interface.

Embodiment 2

Optionally, the method 400 further includes: S432: The first access network node sends a third data packet of the first multicast service to the second access network node based on second transport layer information, where the second transport layer information is carried in the second message. Correspondingly, the second access network node receives the third data packet of the first multicast service based on the second transport layer information. Herein, the third data packet is a data packet of a multicast service that is sent in a unicast mode. The second access network node receives a unicast data packet of the first multicast service, which may also be understood as a data packet transmitted in a unicast mode.

It may be understood that the data packet of the multicast service may be sent in a unicast mode, or may be sent in a multicast mode, or may be sent in a unicast mode and a multicast mode. This is not specifically limited.

The second message is used to notify the first access network node of tunnel-related information (for example, an address and a tunnel identifier). A tunnel further includes a unicast tunnel established by the second access network node for a unicast transmission mode. The second transport layer information is used by the first access network node to determine the unicast tunnel established by the second access network node in the unicast transmission mode, so that the first access network node can transmit a data packet on the unicast tunnel in the unicast mode.

It should be understood that an example in which the second transport layer information and the first transport layer information are in the second message is used herein for description. However, this application is not limited thereto. Optionally, the second transport layer information and the first transport layer information may not be in a same message. "Not in a same message" may be understood as "sent by using different messages", and the different messages are messages sent at different moments. This is because a unicast tunnel and a multicast tunnel of a terminal device may not be established at the same time. Optionally, names of the different messages may be the same or different. This is not limited. However, the messages essentially include different content.

The second transport layer information includes information about a second user plane address. The second user plane address is used by the second access network node to establish a unicast tunnel. The second user plane address corresponds to the unicast tunnel established by the second access network node for a unicast transmission mode. The unicast tunnel is used to transmit a data packet of the multicast service that is sent in the unicast mode. The second user plane address is an address of the tunnel. For example, the second transport layer information includes an endpoint IP address (Endpoint IP Address) and a tunnel endpoint identifier GTP-TEID. For other content included in the first transport layer information, refer to descriptions in the standard.

Herein, the second access network node may further establish a plurality of unicast tunnels used for services transmitted in a unicast mode. The plurality of unicast tunnels herein are related to terminal devices, that is, one terminal device corresponds to one unicast tunnel. It should be noted that the plurality of unicast tunnels are not simultaneously established by the second access network node, but are established in a related bearer establishment process of each terminal device (for example, established when a terminal device is interested in a multicast service or needs to receive a multicast service). For a multicast service-related bearer of a single terminal device, there are two downlink user plane tunnels. Services carried on the two downlink user plane tunnels are multicast services, which are different from each other in a transmission mode. One downlink user plane tunnel is a tunnel (which may be referred to as a multicast tunnel) used to transmit a multicast service in a multicast transmission mode, and the other downlink user plane tunnel is a tunnel (which may be referred to as a unicast tunnel) used to transmit a data packet of a multicast service in a unicast transmission mode. It may be understood that a plurality of terminal devices share a same multicast tunnel, that is, addresses of multicast tunnels are the same. In addition, one data packet is transmitted on the multicast tunnel, that is, one data packet is sent to the plurality of terminal devices. A plurality of multicast services/multicast service flows may share a same multicast tunnel, and a data packet sent on the multicast tunnel may be received by a plurality of terminal devices. This helps save resources, improve spectrum utilization, reduce a delay, and reduce complexity of a network device. The plurality of terminal devices are a plurality of terminal devices that receive a same multicast service. Because the plurality of multicast services/multicast service flows share the same multicast tunnel, there is no need to occupy a plurality of tunnels. This reduces resource occupation on a network device side, alleviates processing load of the network device, imposes no excessively high requirement on a capability of the network device, and reduces complexity of the network device.

Figure 6:
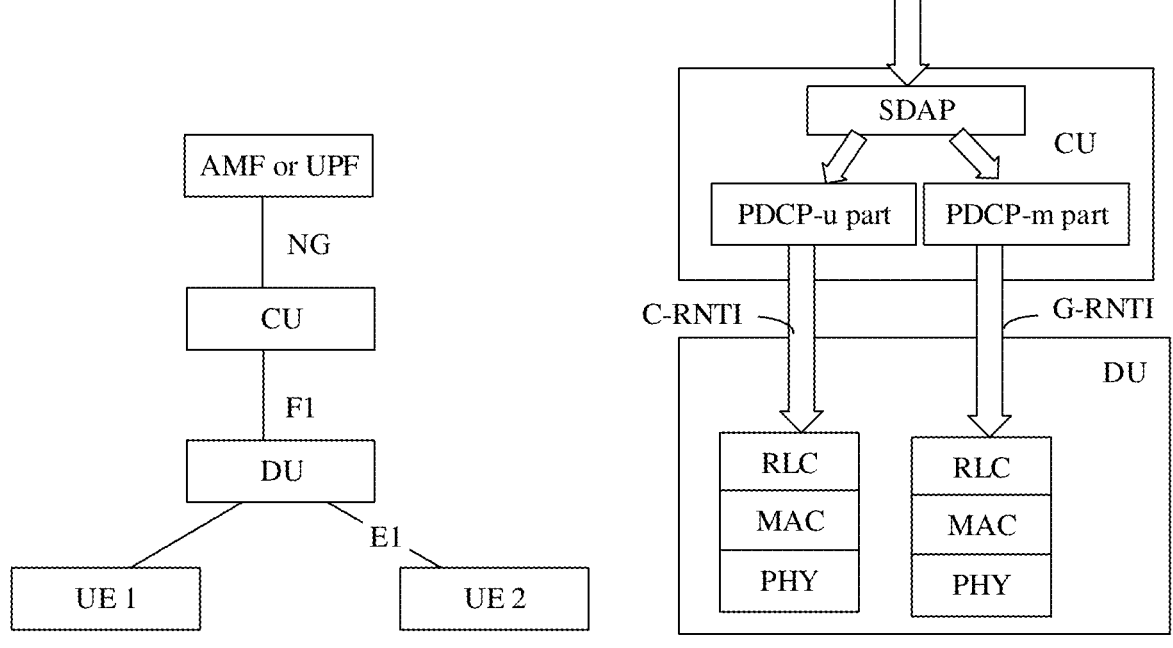
FIG. 6 is a schematic diagram of another example of a communications method according to an embodiment of this application.

When the second access network node establishes one or more unicast tunnels and one multicast tunnel, the left figure in FIG. 6 is a schematic diagram of an architecture in which a plurality of tunnels are established between a CU and a DU. For example, one multicast tunnel and N unicast tunnels are established between the CU and the DU, where a value of N is determined by a quantity of terminal devices, that is, each of N terminal devices has one unicast tunnel. The multicast tunnel is shared by the N terminal devices. As shown in the right figure in FIG. 6, two different parts (a PDCP-u part and a PDCP-m part are used as an example for description in FIG. 6) of one PDCP layer may be used to separately process a service transmitted through a unicast tunnel and a service transmitted through a multicast tunnel, and functions of the two PDCU parts are the same. Alternatively, there may be two independent PDCP layers (not shown in FIG. 6), that is, the two PDCP layers are used to separately process a service transmitted through a unicast tunnel and a service transmitted through a multicast tunnel. Access stratum security (AS security) activation may be performed, by using different parameters/keys or a same parameter/key, on a data packet transmitted in a unicast mode and a data packet transmitted in a multicast mode, which are separately sorted.

In this embodiment of this application, the first access network node may determine a transmission mode in which the second access network node sends a data packet of the first multicast service to a first terminal device.

Optionally, the method 400 further includes: S460: The first access network node sends a notification message to the second access network node, where the notification message is used to indicate a transmission mode in which the second access network node sends a data packet of the first multicast service, and the transmission mode includes a unicast mode and/or a multicast mode. In other words, the first access network node may determine the transmission mode, so that an appropriate transmission mode can be determined based on a channel condition of a terminal device, thereby ensuring quality of a service received by the terminal device.

Optionally, before the first access network node sends the notification message to the second access network node, the method 400 further includes: S450: The second access network node sends a fourth message to the first access network node, where the fourth message includes a measurement result of the first terminal device. Herein, the first access network node receives the fourth message from the second access network node, and then determines, based on the measurement result of the first terminal device, the transmission mode in which the second access network node sends a data packet to the first terminal device. This can ensure/improve service transmission quality while saving resources, thereby optimizing experience of each user. In this way, the first access network node may learn of signal quality based on measurement results of different terminal devices, to select a transmission mode for each terminal device based on a channel condition of each terminal device. Quality of a service received by the terminal device has a corresponding quality requirement. The quality requirement may be determined by a core network device or a higher layer device. Specifically, if the signal quality is relatively good, the first access network node may determine that the transmission mode is the multicast mode. If the signal quality is average, the first access network node may determine that the transmission mode is the unicast mode, or the multicast mode and the unicast mode. This improves service transmission quality, and improves experience of each user.

Optionally, the measurement result may include a signal quality measurement result of a terminal device, for example, a signal quality measurement result related to a beam. That is, the first access network node may determine the transmission mode based on the signal measurement result of the terminal device. A value of the measurement result may be represented by one or more of the following parameters: reference signal received power (reference signal receiving power, RSRP), reference signal received quality (reference signal receiving quality, RSRQ), and a signal to interference plus noise ratio (signal to interference plus noise ratio, SINR).

Optionally, the first access network node may determine the transmission mode based on a measurement result and a threshold. For example, a value of the measurement result is represented by RSRP, and the threshold is an RSRP threshold. If the RSRP value of the measurement result is greater than or equal to an RSRP threshold 1, the transmission mode is the multicast mode: if the measurement result is less than the RSRP threshold 1 and greater than an RSRP threshold 2, the transmission mode is the multicast mode or the unicast mode: or if the measurement result is less than or equal to the RSRP threshold 2, the transmission mode is the unicast mode.

A manner of reporting the signal quality measurement result (for example, a UE beam related report (UE beam related report)) of the terminal device is not limited in this embodiment of this application. There may be a plurality of reporting manners, for example, a network required (network required) manner, a periodic reporting (periodic reporting) manner, and an event-triggered reporting manner (for example, by setting a reporting threshold). A type of a message for reporting the signal quality measurement result of the terminal device is not limited in this embodiment of this application. For example, the message may be a higher layer RRC message, or may be a measurement report of a physical layer (layer) 1.

Alternatively, the second access network node may determine a transmission mode for sending a data packet of the first multicast service. Optionally, the method 400 further includes: S440: The second access network node determines, based on a measurement result of the first terminal device, a transmission mode for sending a data packet of the first multicast service, where the transmission mode includes a unicast mode and/or a multicast mode. In other words, the second access network node may determine a to-be-used transmission mode by using an implementation algorithm of the second access network node or based on information such as a signal quality measurement result of the terminal device. The second access network node does not need to send the measurement result to the first access network node, and the first access network node does not need to send the transmission mode to the second access network node. This reduces signaling interaction between the first access network node and the second access network node, reduces a delay, and alleviates service load of the first access network node. The second access network node needs to manage only a terminal device working on the node, and make a corresponding decision based on a measurement result reported by the terminal device, to ensure service quality.

Similarly, a value of the measurement result may be represented by one or more of the following parameters: RSRP, RSRQ, and an SINR. Optionally, the second access network node may determine the transmission mode based on a value of a measurement result and a threshold. For example, the value of the measurement result is represented by RSRP, and the threshold is an RSRP threshold. If the RSRP value of the measurement result is greater than or equal to an RSRP threshold 1, the transmission mode is the multicast mode; if the RSRP value of the measurement result is less than the RSRP threshold 1 and greater than an RSRP threshold 2, the transmission mode is the multicast mode or the unicast mode: or if the RSRP value of the measurement result is less than or equal to the RSRP threshold 2, the transmission mode is the unicast mode.

In this embodiment of this application, the transmission mode may be determined by the first access network node, or may be determined by the second access network node. That is, a manner of determining the transmission mode is relatively flexible.

For the second access network node, that the second access network node sends a second data packet of the first multicast service to a first terminal device by using the first radio bearer includes: when the multicast mode is used, sending, to the first terminal device by using the first radio bearer, the first data packet received based on the first transport layer information: or when the unicast mode is used, sending, to the first terminal device by using the first radio bearer, the third data packet (the unicast data packet) received based on the second transport layer information. The first terminal device is used as an example. For the first terminal device, the second access network node may transmit a data packet to the first terminal device in the unicast and/or multicast mode, that is, unicast, multicast, or unicast and multicast.

It should be noted that, when the second access network node sends a data packet to the first terminal device in the unicast mode and the multicast mode, the second data packet sent by the second access network node to the first terminal device may include two types of data packets: a unicast data packet and a multicast data packet. This depends on a transmission mode used by the second access network node. The unicast data packet means that, when the unicast mode is used for sending, the second access network node sends, to the first terminal device, the unicast data packet (the third data packet) received based on the second transport layer information. The multicast data packet means that, when the multicast mode is used for sending, the second access network node sends, to the first terminal device, the multicast data packet (the first data 10 packet) received based on the first transport layer information. "Received based on the first transport layer information" may be understood as "received by using content included in the first transport layer information". For example, if the first transport layer information includes the first user plane address, "received based on the first transport layer information" includes "received based on the first user plane address". "Received based on the second transport layer information" 5 may be understood as "received by using content included in the second transport layer information". For another example, if the second transport layer information includes the second user plane address, "received based on the second transport layer information" includes "received based on the second user plane address".

Therefore, in this embodiment of this application, two types of tunnels are established between the CU and the DU. One type of tunnel is used to transmit a multicast service (that is, multicast services of a plurality of terminal devices may be transmitted on the type of tunnel). The other type of tunnel is used to implement transmission in a unicast mode (that is, a multicast service may be sent to a terminal device corresponding to the tunnel through the tunnel in the unicast mode). This implements diversified transmission of the multicast service.

Embodiment 3

The foregoing describes the communications method in the CU-DU architecture (that is, a CU-CP and a CU-UP are not split). The following describes a communications method in a CU-CP-CU-UP split architecture with reference to FIG. 7.

Figure 7:
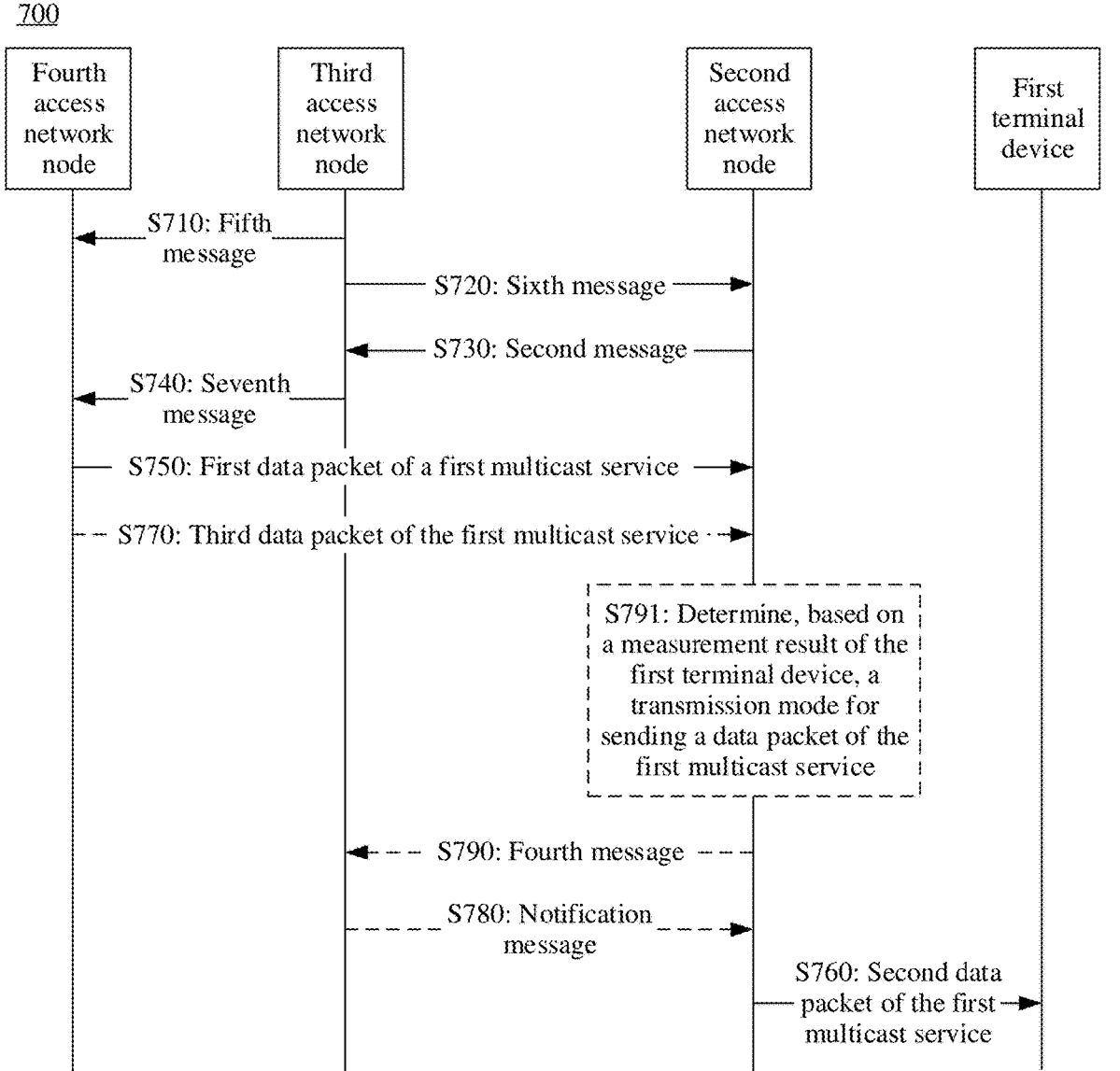
FIG. 7 is a schematic interaction diagram of another communications method according to an embodiment of this application.

FIG. 7 is a schematic interaction diagram of a communications method 700 according to an embodiment of this application. It may be understood that some or all information exchanged between a third access network node and a second access network node (or a fourth access network node) in FIG. 7 may be carried in an existing message, channel, signal, or signaling, or may be a newly defined message, channel, signal, or signaling. This is not specifically limited. For example, some or all information exchanged between the third access network node and the second access network node may be carried in an existing F1 interface message, or may be carried in a newly defined F1 interface message. It may be understood that an F1 interface is merely used as an example for description herein, but does not constitute a limitation on this embodiment of this application. Actually, an interface between a CU and a DU in another split architecture may also be used herein. For another example, some or all information exchanged between the third access network node and the fourth access network node may be carried in an existing E1 interface message, or may be carried in a newly defined E1 interface message. It may be understood that an E1 interface is merely used as an example for description herein, but does not constitute a limitation on this embodiment of this application. Actually, an interface between a CU-CP and a CU-UP in another split architecture may also be used herein. For unified description herein, the E1 interface in this embodiment of this application may be extended to an interface in another split architecture, or may evolve into a logical interface. As shown in FIG. 7, the method 700 includes the following steps.

S710: The third access network node sends a fifth message to the fourth access network node, where the fifth message is used to request to establish a first radio bearer, the fifth message includes a third indication, and the third indication indicates that the first radio bearer carries a first multicast service.

The fifth message is used to request to establish a radio bearer, that is, the first radio bearer, for the first multicast service. The third indication indicates that the first multicast service is subsequently transmitted on the first radio bearer.

The fifth message is a message exchanged between the third access network node and the fourth access network node, that is, a message between the control plane of the central unit and the user plane of the central unit. The fifth message may be transmitted through the E1 interface.

The third access network node and the fourth access network node may be understood as corresponding to different functions in a same central unit. The third access network node and the fourth access network node may be independently deployed. For example, the third access network node is a node or an entity corresponding to a control plane function of the central unit, and the fourth access network node is a node or an entity corresponding to a user plane function of the central unit. The second access network node is a node or an entity corresponding to the distributed unit.

The third indication may be used for explicit indication, or may be used for implicit indication. This is not specifically limited. The following provides description by using examples.

For example, when being used for explicit indication, the third indication explicitly indicates that a service flow for the first multicast service is a multicast service flow (for example, a multicast service flow) or a multicast service. In a possible implementation, the third indication may be an information element IE or a field, that is, the third indication explicitly indicates, by using the IE or the field, that a service is a multicast service or a multicast service flow. An attribute of the IE or the field may be an enumeration (ENUMERATED {XXX}) type, for example, {true/false} may be enumerated, or enumeration may not be used. This is not specifically limited in this embodiment.

For another example, when being used for implicit indication, the third indication includes a multicast service flow or identifier. If the fourth access network node receives a multicast service/multicast service flow or identifier, it indicates the multicast service. For example, in a CU-UP-CU-CP split architecture, the third access network node may be a CU-CP, the fourth access network node may be a CU-UP, and the second access network node may be a DU.

The first radio bearer is used to carry the first multicast service. Specifically, in the CU-UP-CU-CP split architecture, data and/or signaling from the CU-CP to the CU-UP, data and/or signaling from the CU-UP to the DU, and data and/or signaling from the DU to UE are all carried in the first radio bearer. The first radio bearer may be referred to as a multicast radio bearer or a dual cast radio bearer (dual cast RB)/multicast radio bearer. It may be understood that a specific name of the first radio bearer is not limited herein. There may be another name in the future, but the first radio bearer is essentially used to carry a multicast service. For unified description herein, the multicast service may also be referred to as a multicast service, but a specific name is not limited. For example, the first multicast service may be a multicast broadcast service MBS.

Optionally, before S710, the method 700 further includes: A core network node or a multicast control function node sends a third message to the third access network node, where the third message includes a second indication, and the second indication indicates the first multicast service. For example, the second indication indicates whether a service is a multicast service flow (a multicast service flow). Herein, the third access network node may receive the third message from the core network node or the multicast control function node, where the second indication included in the third message indicates the first multicast service.

The third message is used by the core network node or the multicast control function node to notify the third access network node of information about the first multicast service. The second indication indicates that a service that needs to be subsequently transmitted is a multicast service, for example, the first multicast service.

The third message is a message exchanged between the core network node or the multicast control function node and the third access network node. The third message may be transmitted through an NG interface.

For a method in which the second indication is used for explicit indication or implicit indication, refer to the descriptions in the method 400. For brevity, details are not described herein again.

For example, the core network node is used as an example. When the core network node delivers a multicast service, the second indication received by the third access network node indicates that a QoS flow for the delivered service is a multicast service flow.

Optionally, the third message further includes a multicast security parameter (security parameter), and the multicast security parameter includes a security key and/or a security algorithm. It may be understood that an example in which the multicast security parameter includes the security key and/or the security algorithm is used for description herein, but this application is not limited thereto. For example, the security algorithm may include an encryption algorithm and an integrity protection algorithm, and the multicast security parameter may also include another parameter. This is not specifically limited.

The third access network node learns, based on the second indication, that the service is the multicast service, and the third access network node (or an SDAP layer of the third access network node) may map the first multicast service to the first radio bearer. If the third message includes the multicast security parameter, a PDCP entity of the third access network node that corresponds to the first radio bearer encrypts a multicast data packet/PDU session. For a specific encryption process, refer to descriptions of integrity protection and/or encryption (integrity protection or/and ciphering) in the protocol.

If the third access network node learns of the multicast security parameter, the third access network node may also notify the fourth access network node of the multicast security parameter. Optionally, the fifth message includes a multicast security parameter, and the multicast security parameter includes a security key and/or a security algorithm. Further, security activation may be performed by using the multicast security parameter, to ensure security of a user and a network device, prevent data from being eavesdropped and/or tampered with, improve communication security, ensure network security, and ensure user rights.

S720: The third access network node sends a sixth message to the second access network node, where the sixth message is used to request to establish the first radio bearer, the sixth message includes a first indication, and the first indication indicates that the first radio bearer carries the first multicast service. Correspondingly, the second access network node receives the sixth message.

The sixth message is a message exchanged between the third access network node and the second access network node, that is, a message between the control plane of the central unit and the distributed unit. The sixth message may be transmitted through an F1-C interface.

The sixth message is used to request to establish a radio bearer, that is, the first radio bearer, for the first multicast service. The first indication indicates that the first multicast service is subsequently transmitted on the first radio bearer.

For a method in which the first indication is used for explicit indication or implicit indication, refer to the descriptions in the method 400. For brevity, details are not described herein again.

The third access network node sends the sixth message to the second access network node, to request the second access network node to establish the first radio bearer, or request the second access network node to establish a downlink tunnel for transmitting the first multicast service. Alternatively, the sixth message may be understood as that the third access network node notifies the second access network node that the first radio bearer is a dual cast RB, that is, the first radio bearer is used to carry the first multicast service.

After receiving the sixth message, the second access network node provides a downlink user plane tunnel for the first radio bearer, or establishes a downlink user plane tunnel used to receive a data packet of the first multicast service. In other words, in response to the first message, the second access network node provides, for the first radio bearer, the downlink user plane tunnel used to receive the data packet of the first multicast service, or establishes the downlink user plane tunnel used to receive the data packet of the first multicast service. In other words, the second access network node may establish a user plane tunnel such as a GTP-U tunnel for the first radio bearer between the fourth access network node and the second access network node. The second access network node may send information about the established downlink user plane tunnel to the third access network node, so that the third access network node can send the information about the downlink user plane tunnel to the fourth access network node. The GTP-U tunnel is used to transmit the data packet of the first multicast service.

S730: The second access network node sends a second message to the third access network node, where the second message includes first transport layer information corresponding to the first radio bearer. Correspondingly, the third access network node receives the second message.

The second message herein is a message exchanged between the third access network node and the second access network node, that is, a message between the control plane of the central unit and the distributed unit. The second message herein may be transmitted through the F1-C interface.

The second message herein is used to notify the third access network node of tunnel-related information (for example, an address and a tunnel identifier), so that the third access network node can send the tunnel-related information to the fourth access network node.

Optionally, the first transport layer information includes a first user plane address. The first user plane address is address information of the downlink user plane tunnel. The first user plane address corresponds to the downlink user plane tunnel established by the second access network node to transmit the first multicast service. The first user plane address is an address of the downlink user plane tunnel. As described above, the downlink user plane tunnel is used to transmit the data packet of the first multicast service.

The first transport layer information corresponding to the first radio bearer may include: The first radio bearer corresponds to one first user plane address, or corresponds to a plurality of first user plane addresses. A plurality of terminal devices may share the downlink user plane tunnel. The first user plane address herein may be a downlink user plane address.

After obtaining the first transport layer information, the third access network node may send the first transport layer information to the fourth access network node.

S740: The third access network node sends a seventh message to the fourth access network node, where the seventh message includes the first transport layer information. Correspondingly, the fourth access network node receives the seventh message.

The seventh message herein is a message exchanged between the third access network node and the fourth access network node, that is, a message between the control plane of the central unit and the user plane of the central unit. The seventh message herein may be transmitted through the E1 interface.

The seventh message is used to notify the fourth access network node of tunnel-related information (for example, an address and a tunnel identifier). A tunnel includes the downlink user plane tunnel established between the fourth access network node and the second access network node. The first transport layer information is used by the fourth access network node to determine the downlink user plane tunnel established between the second access network node and the fourth access network node, so that the fourth access network node can transmit the data packet of the first multicast service through the downlink user plane tunnel.

In the method 700, the third access network node may determine a transmission mode in which the second access network node sends a data packet, and notify the second access network node of the transmission mode, so that an appropriate transmission mode can be determined based on a channel condition of a terminal device, thereby ensuring quality of a service received by the terminal device. A specific process in which the third access network node determines the transmission mode is similar to that of the first access network node in the method 400. For details, refer to the foregoing descriptions.

Optionally, the second access network node may determine the transmission mode. For related descriptions of a specific process, refer to the descriptions in the method 400. Details are not described herein again.

The fourth access network node can transmit, to the second access network node on the established downlink tunnel, the data packet of the first multicast service that is received from the core network node or the multicast control function node.

Figure 8:
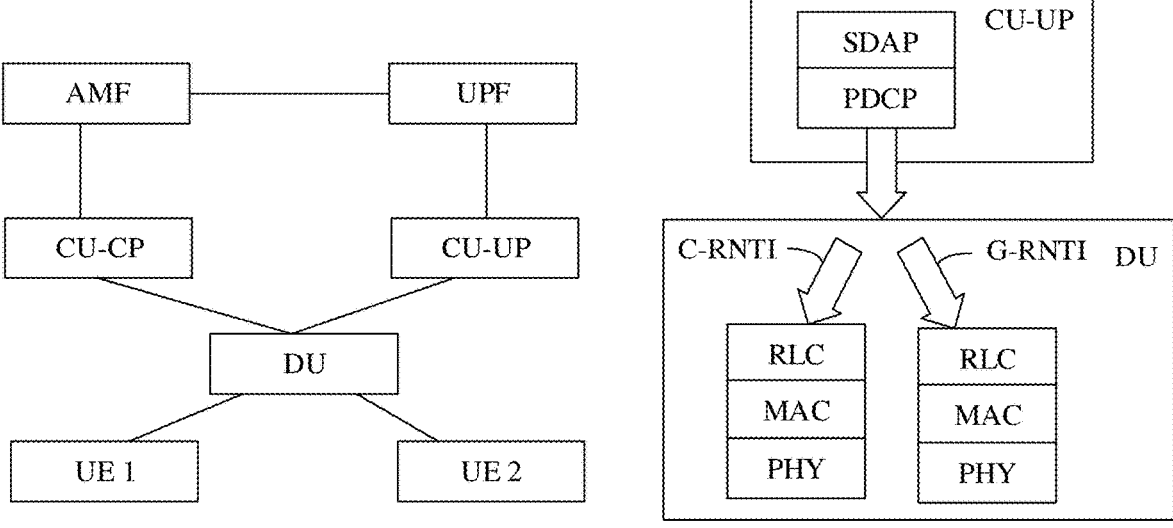
FIG. 8 is a schematic diagram of an example of another communications method according to an embodiment of this application.

FIG. 8 is used as an example for description. It is assumed that the fourth access network node is a CU-UP, the third access network node is a CU-CP, and the second access network node is a DU. In this case, a tunnel is established between the CU-UP and the DU, and the tunnel is used to transmit a data packet of a multicast service that is transmitted in a unicast mode and a multicast mode. An architecture is shown in the left figure in FIG. 8. A processing process of a data packet in a protocol stack is shown in the right figure in FIG. 8. Related processing such as sorting and encryption is performed on the data packet of the first multicast service at a PDCP layer in the CU-UP. In FIG. 8, the data packet is processed by using one PDCP layer. For the first multicast service, access stratum security activation is performed, by using a same parameter/key, on a data packet that is transmitted in a unicast mode and that is scrambled by using a C-RNTI and a data packet that is transmitted in a multicast mode and that is scrambled by using a G-RNTI (the G-RNTI is an RNTI corresponding to a multicast service), or access stratum security activation is not performed. Herein, whether to perform access stratum security activation may be specifically determined based on a configuration in the foregoing message (the third message or the fifth message). It may be understood that the G-RNTI is used as an example herein to describe the RNTI corresponding to the multicast service, but this application is not limited thereto. The G-RNTI may be replaced with another identifier, and is essentially used to scramble a data packet transmitted in a multicast mode.

S750: The fourth access network node sends a first data packet of the first multicast service to the second access network node based on the first transport layer information. Correspondingly, the second access network node receives the first data packet of the first multicast service based on the first transport layer information.

Optionally, the fourth access network node may duplicate the data packet of the first multicast service that is received from the core network node, to obtain two data packets. Optionally, the fourth access network node may add indication information to each data packet, and the indication information indicates that data is sent to a terminal device in a multicast or unicast transmission mode. Herein, the two data packets are transmitted to the second access network node through a same downlink tunnel, that is, a tunnel corresponding to a first downlink user plane address.

Optionally, the fourth access network node does not need to duplicate the data packet, but the second access network node duplicates the data packet to obtain two data packets. The fourth access network node sends one data packet to the second access network node through the tunnel corresponding to the first downlink user plane address. After receiving the data packet, the second access network node duplicates the data packet, and separately distributes the two data packets to a multicast logical channel and a unicast logical channel. The multicast logical channel is used to transmit a data packet transmitted in a multicast mode, and the unicast logical channel is used to transmit a data packet transmitted in a unicast mode.

S760: The second access network node sends a second data packet of the first multicast service to a first terminal device by using the first radio bearer. A sending manner is similar to that in the method 400. For details, refer to the foregoing descriptions.

The second data packet is a data packet of the first multicast service that is sent by the second access network node to the first terminal device. The first data packet in S750 is a data packet sent by the fourth access network node to the second access network node. It may be understood that the first data packet may be the same as or different from the second data packet. This is not limited.

For example, the first data packet and the second data packet are data packets of a same multicast service, that is, both are data packets of the first multicast service. For a same service, a payload (payload) of the first data packet is the same as a payload (payload) of the second data packet. In addition, because a transmit/receive end of the first data packet is different from a transmit/receive end of the second data packet, a header of the first data packet is different from a header of the second data packet.

This embodiment of this application may be applied to a CU-CP-CU-UP architecture. The third access network node may be a CU-CP, the fourth access network node may be a CU-UP, and the second access network node may be a DU. In this embodiment of this application, in consideration of an architecture in which a CP and a UP of a CU are split, the first radio bearer is introduced to transmit the multicast service on the F1 interface, so that data of the multicast service can be transmitted on the F1 interface. In addition, a tunnel is established between the CU and the DU, to transmit the multicast service on the F1 interface. For unified description herein, the F1 interface in this embodiment of this application may be extended to an interface in another split architecture, or may evolve into a logical interface.

Embodiment 4

The following describes an embodiment in which a plurality of downlink tunnels are established between the fourth access network node and the second access network node.

Optionally, the method 700 further includes: S770: The fourth access network node sends a third data packet of the first multicast service to the second access network node based on second transport layer information, where the second transport layer information is carried in the seventh message. Correspondingly, the second access network node receives the third data packet of the first multicast service based on the second transport layer information. The third data packet is a data packet of a multicast service that is sent in a unicast mode. Herein, the second access network node receives a unicast data packet of the first multicast service, which may also be understood as a data packet transmitted in a unicast mode.

The seventh message is used to notify the fourth access network node of tunnel-related information (for example, an address and a tunnel identifier). A tunnel further includes a unicast tunnel established by the second access network node for a unicast transmission mode. The second transport layer information is used by the fourth access network node to determine the unicast tunnel established by the second access network node in the unicast transmission mode, so that the fourth access network node can transmit a data packet on the unicast tunnel in the unicast mode.

It should be understood that an example in which the first transport layer information and the second transport layer information are in the seventh message is used herein for description. However, this application is not limited thereto. Optionally, the first transport layer information and the second transport layer information may not be in a same message. "Not in a same message" may be understood as "sent by using different messages", and the different messages are messages sent at different moments. This is because a unicast tunnel and a multicast tunnel of a terminal device may not be established at the same time. Optionally, names of the different messages may be the same or different. This is not limited. However, the messages essentially include different content.

The second transport layer information includes information about a second user plane address. The second user plane address is used by the second access network node to establish a unicast tunnel. The second user plane address corresponds to the tunnel established by the second access network node for a unicast transmission mode. The tunnel is used to transmit a data packet of the multicast service that is sent in the unicast mode. The second user plane address is an address of the tunnel.

Herein, the second access network node may further establish a plurality of unicast tunnels used for services transmitted in a unicast mode. The plurality of unicast tunnels herein are related to terminal devices, that is, one terminal device corresponds to one unicast tunnel. It should be noted that the plurality of unicast tunnels are not simultaneously established by the second access network node, but are established in a related bearer establishment process of each terminal device (that is, established when a terminal device is interested in a multicast service or needs to receive a multicast service).

For a related bearer of a single terminal device, there are two downlink tunnels. Services carried on the two downlink tunnels are multicast services, which are different from each other in a transmission mode. One downlink tunnel is a tunnel (which may be referred to as a multicast tunnel) used to transmit a multicast service in a multicast transmission mode, and the other downlink tunnel is a tunnel (which may be referred to as a unicast tunnel) used to transmit a data packet of a multicast service in a unicast transmission mode. It may be understood that a plurality of terminal devices share a same multicast tunnel, that is, addresses of multicast tunnels are the same. In addition, one data packet is transmitted on the multicast tunnel, that is, one data packet is sent to the plurality of terminal devices, and all related terminal devices may receive the data packet sent on the multicast tunnel. This saves resources, and improves spectrum utilization. The related terminal device is a terminal device that establishes the first radio bearer (for example, a dual cast RB) and that may receive the first multicast service (for example, an MBS QoS flow). In other words, a plurality of multicast services/multicast service flows may share a same multicast tunnel, and a data packet sent on the multicast tunnel may be received by a plurality of terminal devices. This helps save resources, improve spectrum utilization, reduce a delay, and reduce complexity of a network device. The plurality of terminal devices are a plurality of terminal devices that receive a same multicast service. Because the plurality of multicast services/multicast service flows share the same multicast tunnel, there is no need to occupy a plurality of tunnels. This reduces resource occupation on a network device side, alleviates processing load of the network device, imposes no excessively high requirement on a capability of the network device, and reduces complexity of the network device.

Figure 9:
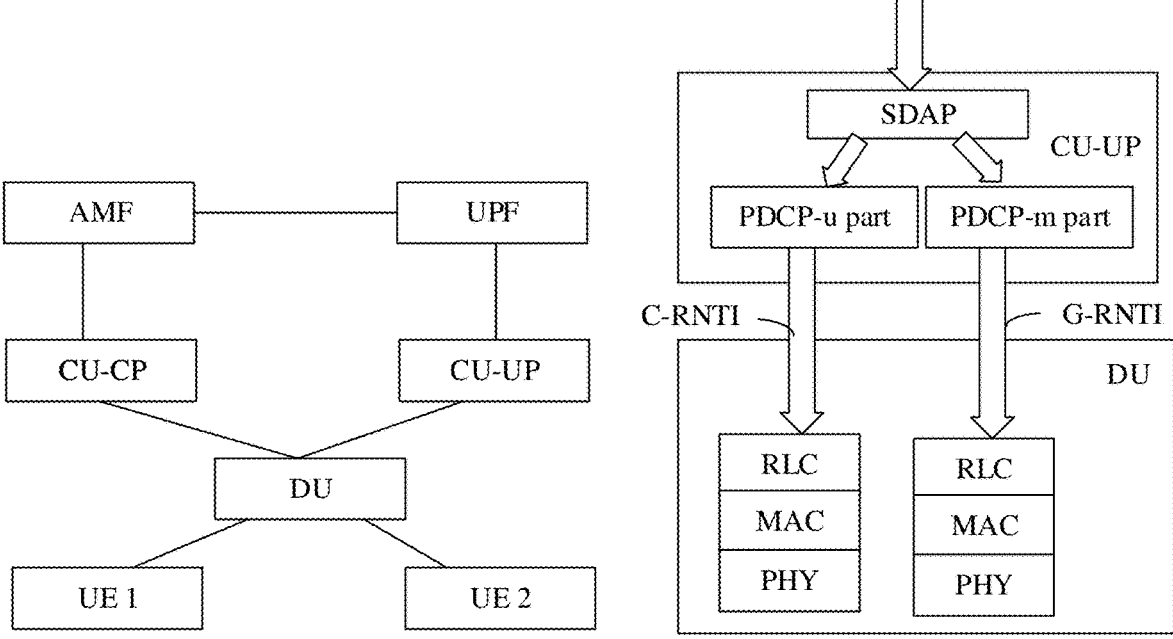
FIG. 9 is a schematic diagram of another example of another communications method according to an embodiment of this application.

When the second access network node establishes a plurality of unicast tunnels and one multicast tunnel, the left figure in FIG. 9 shows an architecture in which a plurality of tunnels are established between a CU-UP and a DU. As shown in the right figure in FIG. 9, two different parts (a PDCP-u part and a PDCP-m part) of one PDCP layer may be used to separately process a service for unicast transmission and a service for multicast transmission, and functions of the two PDCU parts are the same. Alternatively, there may be two independent PDCP layers (two different parts of one PDCP layer are used as an example for description in FIG. 9), that is, the two PDCP layers are used to separately process a service for unicast transmission and a service for multicast transmission. Access stratum security (AS security) activation may be performed, by using different parameters/keys or a same parameter/key, on a data packet transmitted in a unicast mode and a data packet transmitted in a multicast mode, which are separately sorted.

In this embodiment of this application, the third access network node may determine a transmission mode in which the second access network node sends a data packet of the first multicast service.

Optionally, the method 700 further includes: S780: The third access network node sends a notification message to the second access network node, where the notification message is used to indicate a transmission mode in which the second access network node sends a data packet of the first multicast service, and the transmission mode includes a unicast mode and/or a multicast mode. In other words, the third access network node may determine the transmission mode.

Optionally, before the third access network node sends the notification message to the second access network node, the method 700 further includes: S790: The second access network node sends a fourth message to the third access network node, where the fourth message includes a measurement result of the first terminal device. Herein, the third access network node receives the fourth message from the second access network node, and then determines, based on the measurement result of the first terminal device, the transmission mode in which the second access network node sends a data packet to the first terminal device. Optionally, the measurement result may include a signal quality measurement result of a terminal device, for example, a signal quality measurement result related to a beam. That is, the third access network node may determine the transmission mode based on the signal measurement result of the terminal device. A value of the measurement result may be represented by one or more of the following parameters: RSRP, RSRQ, and an SINR. Optionally, the third access network node may determine the transmission mode based on a measurement result and a threshold. For example, a value of the measurement result is represented by RSRP, and the threshold is an RSRP threshold. If the RSRP value of the measurement result is greater than or equal to an RSRP threshold 1, the transmission mode is the multicast mode: if the RSRP value of the measurement result is less than the RSRP threshold 1 and greater than an RSRP threshold 2, the transmission mode is the multicast mode or the unicast mode: or if the RSRP value of the measurement result is less than or equal to the RSRP threshold 2, the transmission mode is the unicast mode.

A manner of reporting the signal quality measurement result (for example, a UE beam related report) of the terminal device is not limited in this embodiment of this application. There may be a plurality of reporting manners, for example, a network required (network required) manner, a periodic reporting (periodic reporting) manner, and an event-triggered reporting manner (for example, by setting a reporting threshold). A type of a message for reporting the signal quality measurement result of the terminal device is not limited in this embodiment of this application. For example, the message may be a higher layer RRC message, or may be a measurement report of a physical layer (layer) 1.

Alternatively, the second access network node may determine a transmission mode for sending a data packet of the first multicast service. Optionally, the method 700 further includes: S791: The second access network node determines, based on a measurement result of the first terminal device, a transmission mode for sending a data packet of the first multicast service. For a specific manner of determining the transmission mode by the second access network node, refer to the descriptions of S461 in the method 400. For brevity, details are not described herein again.

For the second access network node, that the second access network node sends a second data packet of the first multicast service to a first terminal device by using the first radio bearer includes: when the multicast mode is used, sending, to the first terminal device by using the first radio bearer, the first data packet received based on the first transport layer information: or when the unicast mode is used, sending, to the first terminal device by using the first radio bearer, the third data packet (the unicast data packet) received based on the second transport layer information. The first terminal device is used as an example. For the first terminal device, the second access network node may transmit a data packet to the first terminal device in the unicast and/or multicast mode, that is, unicast, multicast, or unicast and multicast.

It should be noted that, when the second access network node sends a data packet to the first terminal device in the unicast mode and the multicast mode, the second data packet sent by the second access network node to the first terminal device may include two types of data packets: a unicast data packet and a multicast data packet. This depends on a transmission mode used by the second access network node. The unicast data packet means that, when the unicast mode is used for sending, the second access network node sends, to the first terminal device, the unicast data packet (the third data packet) received based on the second transport layer information. The multicast data packet means that, when the multicast mode is used for sending, the second access network node sends, to the first terminal device, the multicast data packet (the first data packet) received based on the first transport layer information.

"Received based on the first transport layer information" may be understood as "received by using content included in the first transport layer information". For example, if the first transport layer information includes the first user plane address, "received based on the first transport layer information" includes "received based on the first user plane address". "Received based on the second transport layer information" may be understood as "received by using content included in the second transport layer information". For example, if the second transport layer information includes the second user plane address, "received based on the second transport layer information" includes "received based on the second user plane address".

Therefore, in this embodiment of this application, two types of tunnels are established between the CU-UP and the DU. One type of tunnel is used to transmit a multicast service (that is, multicast services of a plurality of terminal devices may be transmitted on the type of tunnel). The other type of tunnel is used to implement transmission in a unicast mode (that is, a multicast service may be sent to a terminal device corresponding to the tunnel through the tunnel in the unicast mode). This implements diversified transmission of the multicast service.

Embodiment 5

The following describes an embodiment in which a multicast control function node determines a transmission mode of a data packet in a CU-DU architecture.

Figure 10:
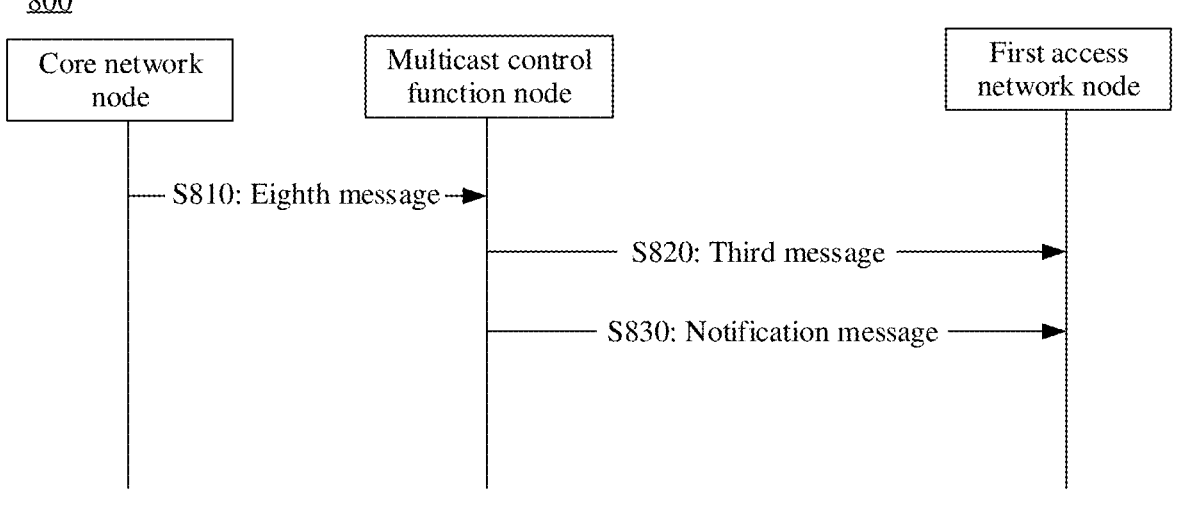
FIG. 10 is a schematic interaction diagram of still another communications method according to an embodiment of this application.

FIG. 10 is a schematic interaction diagram of a communications method 800 according to another embodiment of this application. It may be understood that some or all information exchanged between a multicast control function node and a first access network node (or a core network node) in FIG. 10 may be carried in an existing message, channel, signal, or signaling, or may be a newly defined message, channel, signal, or signaling. This is not specifically limited. As shown in FIG. 10, the method 800 includes the following steps.

S810: The core network node sends an eighth message to the multicast control function node, where the eighth message is used to request to establish a first radio bearer, the eighth message includes a fourth indication, and the fourth indication indicates that the first radio bearer carries a first multicast service. Correspondingly, the multicast control function node receives the eighth message.

The eighth message herein is a message exchanged between the core network node and the multicast control function node. For example, the eighth message may be transmitted through an NG interface.

The eighth message is used to request to establish a radio bearer, that is, the first radio bearer, for the first multicast service. The fourth indication indicates that the first multicast service is subsequently transmitted on the first radio bearer.

Optionally, the multicast control function node may be independently deployed, or may be deployed in an access network node. This is not specifically limited.

For descriptions of the first radio bearer, refer to the descriptions in the method 400. Details are not described herein again.

The fourth indication may be used for explicit indication, or may be used for implicit indication. This is not specifically limited. Explicit indication means directly indicating whether a service is a multicast service flow. Implicit indication means that a service identifier is added to indirectly indicate whether a service is a multicast service. The following provides description by using examples.

For example, when being used for explicit indication, the fourth indication explicitly indicates that a service flow for the first multicast service is a multicast service flow (for example, a multicast service flow) or a multicast service. In a possible implementation, the fourth indication may be an information element IE or a field, that is, the fourth indication explicitly indicates, by using the IE or the field, that a service is a multicast service or a multicast service flow. An attribute of the IE or the field may be an enumeration (ENUMERATED {XXX}) type, for example, {true/false} may be enumerated, or enumeration may not be used. This is not specifically limited in this embodiment.

For another example, when being used for implicit indication, the fourth indication includes a multicast service flow or identifier. If the multicast control function node receives a multicast service/multicast service flow or identifier, it indicates the multicast service.

The multicast control function node may learn, by using the core network node, whether a service is a multicast service, and send, to the first access network node, information used to indicate the multicast service.

S820: The multicast control function node sends a third message to the first access network node, where the third message is used to request to establish the first radio bearer, the third message includes a second indication, and the second indication indicates that the first radio bearer carries the first multicast service. Correspondingly, the first access network node receives the third message.

For descriptions of the second indication, refer to the related descriptions in the method 400. Details are not described herein again.

S830: The multicast control function node sends a notification message to the first access network node, where the notification message is used to indicate a transmission mode in which a second access network node sends a data packet of the first multicast service, and the transmission mode includes a unicast mode and/or a multicast mode.

Optionally, the notification message further includes one or more of the following information: cell list (cell list) information, beam list (beam list) information, area (area) list information, carrier list information, and terminal device list information for receiving the first multicast service.

The multicast control function node may determine the transmission mode, and notify the first access network node of the transmission mode.

Optionally, the method 800 further includes: The first access network node sends a measurement result of a first terminal device to the multicast control function node, where the measurement result is used to determine the transmission mode. Correspondingly, the multicast control function node receives the measurement result of the first terminal device from the first access network node.

Optionally, the measurement result may include a signal quality measurement result of a terminal device, for example, a signal quality measurement result related to a beam. That is, the multicast control function node may determine the transmission mode based on the signal measurement result of the terminal device. A value of the measurement result may be represented by one or more of the following parameters: RSRP, RSRQ, and an SINR.

Optionally, the multicast control function node may determine the transmission mode based on a measurement result and a threshold. For example, a value of the measurement result is represented by RSRP, and the threshold is an RSRP threshold. If the RSRP value of the measurement result is greater than or equal to an RSRP threshold 1, the transmission mode is the multicast mode: if the RSRP value of the measurement result is less than the RSRP threshold 1 and greater than an RSRP threshold 2, the transmission mode is the multicast mode or the unicast mode: or if the RSRP value of the measurement result is less than or equal to the RSRP threshold 2, the transmission mode is the unicast mode. Optionally, the multicast control function node may determine the transmission mode of the data packet on an air interface with reference to the measurement result of the first terminal device and other information. For example, the other information may include one or more of the following information: an implementation and a principle, and a media control function (media control function, MCF) internal algorithm.

A manner of reporting the signal quality measurement result (for example, a UE beam related report) of the terminal device is not limited in this embodiment of this application. There may be a plurality of reporting manners, for example, a network required (network required) manner, a periodic reporting (periodic reporting) manner, and an event-triggered reporting manner (for example, by setting a reporting threshold). A type of a message for reporting the signal quality measurement result of the terminal device is not limited in this embodiment of this application. For example, the message may be a higher layer RRC message, or may be a measurement report of a physical layer (layer) 1.

For example, in the method 800, the multicast control function node may be an MCF, the core network node may be an AMF, and the first access network node may be a CU. In the CU-DU architecture, if a network includes an MCF, the MCF may determine a transmission mode for sending a data packet to a terminal device. This embodiment of this application may be applied to an SFN area in a single frequency network (single frequency network, SFN). In the SFN, a plurality of access network nodes in a synchronized state in different places transmit a same signal at a same moment by using a same frequency, so as to implement reliable coverage for a specific service area. The SFN area is an area that can be covered by the SFN. In this way, multicast transmission or unicast transmission of a same multicast service can be simultaneously performed on related terminal devices of the plurality of access network nodes.

It may be understood that, for a subsequent operation between the first access network node and the second access network node, refer to the descriptions in the method 400. Embodiment 5 is applied to a CU-DU scenario in which the multicast control function node is introduced. It is assumed that the first access network node is a CU, and the second network node is a DU. In this case, in the CU-DU scenario, in the architecture in which the multicast control function node is introduced, the multicast control function node may determine the transmission mode in which the second access network node sends a data packet. In this way, the first radio bearer is introduced to transmit a multicast service on an F1 interface, so that data of the multicast service can be transmitted on the F1 interface. In addition, a tunnel may also be subsequently established between the CU and the DU, to transmit the multicast service on the F1 interface.

Embodiment 6

The following describes an embodiment in which a multicast control function node determines a transmission mode of a data packet in a CU-UP-CU-CP split architecture. A difference between Embodiment 6 and Embodiment 5 lies in that a CU-UP and a CU-CP are split, and the multicast control function node interacts with the CU-CP.

Figure 11:
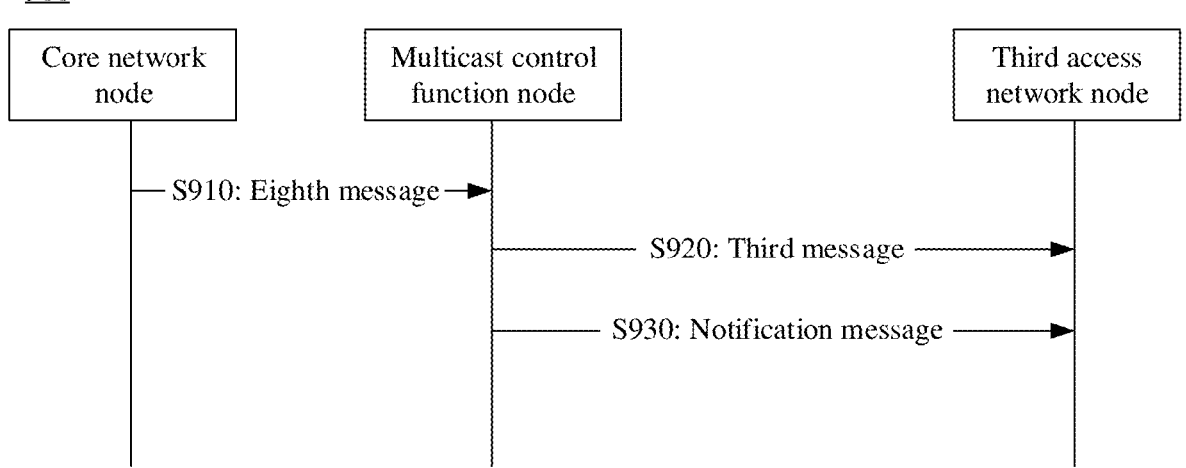
FIG. 11 is a schematic interaction diagram of yet another communications method according to an embodiment of this application.

FIG. 11 is a schematic interaction diagram of a communications method 900 according to another embodiment of this application. It may be understood that some or all information exchanged between a multicast control function node and a third access network node (or a core network node) in FIG. 10 may be carried in an existing message, channel, signal, or signaling, or may be a newly defined message, channel, signal, or signaling. This is not specifically limited. As shown in FIG. 11, the method 900 includes the following steps.

S910: The core network node sends an eighth message to the multicast control function node, where the eighth message is used to request to establish a first radio bearer, the eighth message includes a fourth indication, and the fourth indication indicates that the first radio bearer carries a first multicast service. Correspondingly, the multicast control function node receives the eighth message.

Optionally, the multicast control function node may be independently deployed, or may be deployed in an access network node. This is not specifically limited.

For descriptions of the first radio bearer, refer to the descriptions in the method 400. Details are not described herein again.

The fourth indication may be used for explicit indication, or may be used for implicit indication. This is not specifically limited. Explicit indication means directly indicating whether a service is a multicast service flow. Implicit indication means that a service identifier is added to indirectly indicate whether a service is a multicast service. For an example of the fourth indication, refer to the descriptions in the method 800.

The multicast control function node may learn, by using the core network node, whether a service is a multicast service, and send, to the third access network node, information used to indicate the multicast service.

S920: The multicast control function node sends a third message to the third access network node, where the third message is used to request to establish the first radio bearer, the third message includes a second indication, and the second indication indicates that the first radio bearer carries the first multicast service. Correspondingly, the third access network node receives the third message.

S930: The multicast control function node sends a notification message to the third access network node, where the notification message is used to indicate a transmission mode in which a second access network node sends a data packet of the first multicast service, and the transmission mode includes a unicast mode and/or a multicast mode.

Optionally, the notification message further includes one or more of the following information: cell list (cell list) information, beam list (beam list) information, area (area) list information, carrier list information, and terminal device list information for receiving the first multicast service.

The multicast control function node may determine the transmission mode, and notify the third access network node of the transmission mode.

Optionally, the method 900 further includes: The third access network node sends a measurement result of a first terminal device to the multicast control function node, where the measurement result is used to determine the transmission mode. Correspondingly, the multicast control function node receives the measurement result of the first terminal device.

For descriptions of the measurement result and descriptions of determining the transmission mode by the multicast control function node, refer to the descriptions in the method 800. Details are not described herein again.

For example, in the method 900, the multicast control function node may be an MCF, the core network node may be an AMF, and the third access network node may be a CU-CP. In the CU-CP-CU-UP split architecture, if a network includes an MCF, the MCF may determine a transmission mode for sending a data packet to a terminal device. This embodiment of this application may be applied to an SFN area in a single frequency network SFN. In the SFN, a plurality of access network nodes in a synchronized state in different places transmit a same signal at a same moment by using a same frequency, so as to implement reliable coverage for a specific service area. The SFN area is an area that can be covered by the SFN. In this way, multicast transmission or unicast transmission of a same multicast service can be simultaneously performed on related terminal devices of the plurality of access network nodes.

It may be understood that, for a subsequent operation between the third access network node and the second access network node, or a subsequent operation between the third access network node and a fourth access network node, refer to the descriptions in the method 700. A difference from Embodiment 5 lies in that Embodiment 6 is applied to a scenario in which the CU-UP and the CU-CP are split and the multicast control function node is introduced. It is assumed that the third access network node is a CU-CP, the fourth access network node is a CU-UP, and the second network node is a DU. In this case, in a scenario in which a CP and a UP of a CU are split, in the architecture in which the multicast control function node is introduced, the multicast control function node may determine the transmission mode in which the second access network node sends a data packet. In this way, the first radio bearer is introduced to transmit a multicast service on an F1 interface, so that data of the multicast service can be transmitted on the F1 interface. In addition, a tunnel may also be subsequently established between the CU and the DU, to transmit the multicast service on the F1 interface.

Embodiment 7

In this embodiment of this application, a session (Session) that is related to a terminal device and that is used to transmit multicast service information or data and a user plane tunnel corresponding to the session are established. The session is a basis for performing a data service, and is used to connect a core network and a terminal device. The terminal device may implement data communication with an external data network. For example, the session may be a PDU session, the user plane tunnel may be a GTP-U tunnel, and the multicast service information or data may be a multicast QoS flow.

The following uses the PDU session and the user plane tunnel as an example for description. This embodiment provides a manner of establishing and mapping the PDU session and the user plane tunnel. A dedicated user plane tunnel (for example, the GTP-U tunnel) is established for a multicast service, and existing signaling is optimized, to support transmission of the multicast service on an NG interface between an access network node and a core network node.

In this embodiment of this application, two user plane tunnels are established for one PDU session. One user plane tunnel is used to transmit a QoS flow for a unicast service, and the other user plane tunnel is used to transmit a QoS flow for a multicast service. A same multicast service uses one tunnel for multicast transmission, and one multicast service on one tunnel for multicast transmission uses a same service identifier or a same service QoS flow identifier, for example, a QFI. For a group of terminal devices that receive the multicast service, the service is transmitted by using a same session and a same user plane tunnel, and the service has a same identifier for the group of terminal devices.

Figure 12:
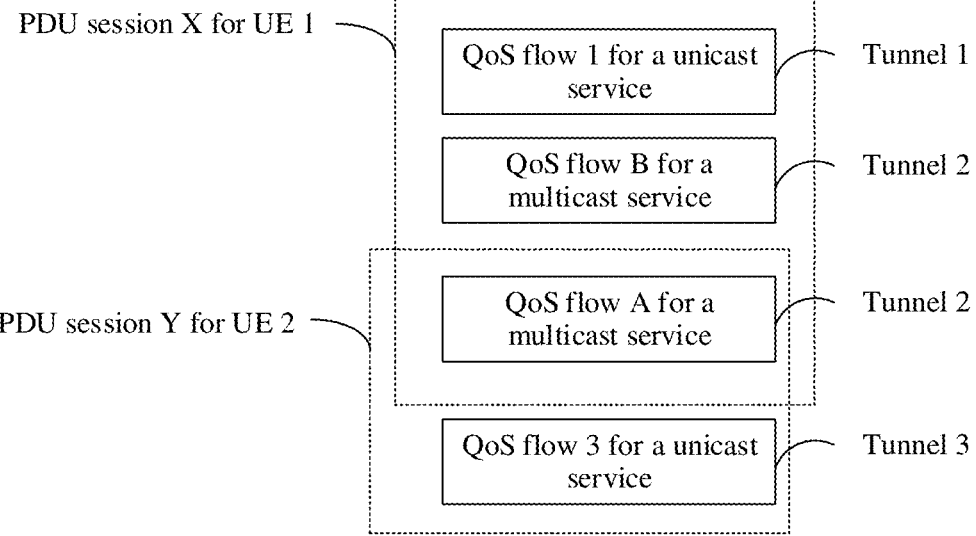
FIG. 12 is a schematic diagram of an example of still another communications method according to an embodiment of this application.

Two user plane tunnels established for one PDU session in this embodiment of this application are described herein with reference to an example in FIG. 12. As shown in FIG. 12, UE 1 receives a service 1 for unicast transmission (or a unicast service), which corresponds to a QoS flow 1, and a service A&B for multicast transmission (or a multicast service), which corresponds to a QoS flow A&B. UE 2 receives a QoS flow 3 for unicast transmission and a QoS flow A for multicast transmission. A PDU session X for the UE 1 includes two tunnels: A tunnel 1 carries the QoS flow 1 for the unicast service, and a tunnel 2 carries the QoS flow A&B for the multicast service. A PDU session Y for the UE 2 includes two tunnels: A tunnel 3 carries the QoS flow 3 for the unicast service, and a tunnel 2 carries the QoS flow A for the multicast service. It can be learned that, for a group of UEs, data (for example, a QoS flow) for multicast transmission is transmitted through a tunnel used to carry a multicast service.

To adapt to the PDU session, this embodiment of this application further provides signaling applicable to the PDU session. The signaling applicable to the PDU session may be a message or signaling transmitted through an interface between a core network node and an access network node (for example, a CU or a CU-CP). For example, the interface between the core network node and the access network node may be an NG interface. However, this embodiment of this application is not limited thereto. The signaling applicable to the PDU session may be used to establish a context or a PDU session.

For example, the message or the signaling transmitted through the interface between the core network node and the access network node (for example, the CU or the CU-CP) includes an initial context setup request (INITIAL CONTEXT SETUP REQUEST) &initial context setup response (INITIAL CONTEXT SETUP RESPONSE), or a PDU session resource setup request (PDU SESSION RESOURCE SETUP REQUEST) &PDU session resource setup response (PDU SESSION RESOURCE SETUP RESPONSE).

For the signaling applicable to the PDU session, signaling sent by the core network node to the access network node is denoted as first signaling. The first signaling includes but is not limited to a multicast QoS flow identifier (for example, a QFI) and a multicast service identifier (for example, a multicast service identifier ID (multicast service ID, MSID)).

Optionally, the core network node may further newly add a multicast security parameter to the first signaling. For descriptions of the multicast security parameter, refer to the foregoing descriptions. Optionally, the multicast security parameter includes an AS security parameter used to activate each multicast service (if an AS layer requires security activation), and a NAS security parameter used to activate each multicast service (if a NAS layer requires security activation). Optionally, information about the NAS security parameter may be carried in a NAS PDU. Optionally, the first signaling may not include information about an uplink tunnel for a multicast service (the information about the uplink tunnel includes an uplink user plane address).

Figure 13:
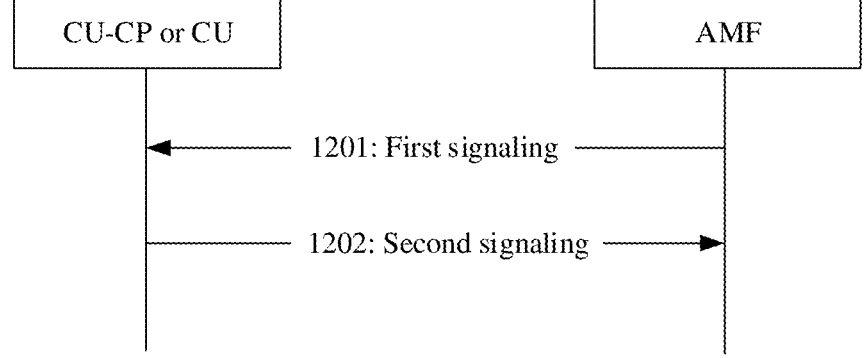
FIG. 13 is a schematic diagram of another example of still another communications method according to an embodiment of this application.

For the signaling applicable to the PDU session, signaling sent by the access network node to the core network node is denoted as second signaling. The second signaling is used to notify the core network node that a corresponding user plane tunnel has been established for a service, or is used to provide an address of a downlink user plane tunnel for the core network node. Optionally, information about the downlink user plane tunnel used to receive the multicast service may be added to the second signaling. Description is provided herein with reference to an interaction diagram in FIG. 13. FIG. 13 is described by using an example in which the core network node is an AMF, and the access network node is a CU-CP (when a CU-UP and a CU-CP are split) or a CU (when a CU-UP and a CU-CP are not split).

As shown in FIG. 13, the method includes the following steps.

1201: The AMF sends first signaling to the CU-CP or the CU. The first signaling is used to request to establish one or more PDU sessions, and the PDU session may be used to transmit unicast service information and/or multicast service information, for example, a QoS flow.

Specifically, the first signaling may be, for example, an initial context setup request or a PDU session resource setup request.

Optionally, the AMF may not provide the CU-CP or the CU with information about an uplink user plane tunnel used for a multicast service (UL NG-U UP TNL Information for MBS service), that is, the AMF does not need to provide the CU-CP or the CU with the information about the uplink user plane tunnel for the multicast service. This is because the multicast service is generally a downlink service.

For a QoS flow for a multicast service, the AMF provides more QoS flow-related information for the CU-CP or the CU based on the original signaling: the initial context setup request or the PDU session resource setup request. The first signaling may include a 5QI, an ARP, and the like of the QoS flow, a multicast QoS flow identifier (for example, a QoS flow identifier (QoS Flow Identifier, QFI)), a multicast service identifier (for example, a multicast service identifier (multicast service ID, MSID)), and the like. Optionally, the first signaling may further include a multicast security parameter. For descriptions of the multicast security parameter, refer to the foregoing descriptions. Optionally, the multicast security parameter includes an AS security parameter used to activate each multicast service (if security activation is required), and a NAS security parameter used to activate each multicast service (if security activation is required).

Optionally, information about the NAS security parameter may be carried in a NAS PDU.

1202: The CU-CP or the CU sends second signaling to the AMF. The second signaling is used to respond to the first signaling. Specifically, the second signaling may be, for example, an initial context setup response or a PDU session resource setup response.

The UE 1 is used as an example. Because a new tunnel is established in the PDU session to transmit a QoS flow for a multicast service, information about a downlink user plane tunnel used to transmit the multicast service, for example, DL NG-U UP TNL information for MBS service, needs to be added to the second signaling. That is, the CU-CP or the CU indicates, to the AMF, the information about the downlink user plane tunnel used to receive the multicast service. Optionally, the information about the downlink user plane tunnel includes an endpoint IP address (Endpoint IP Address), a tunnel endpoint identifier GTP-TEID, and the like.

If the UE receives a unicast service, a unicast tunnel needs to be established, and then information about the unicast service, for example, a QoS flow, is transmitted through the unicast tunnel. If the UE receives a multicast service, a multicast tunnel needs to be established, and then information about the multicast service, for example, a QoS flow, is transmitted through the multicast tunnel.

After establishing the information used to carry the multicast service, for example, the tunnel of the QoS flow, and the information used to carry the unicast service, for example, the tunnel of the QoS flow, the CU-CP or the CP returns response signaling, that is, the second signaling, to the AMF. The second signaling is used to notify the AMF that a corresponding tunnel has been established for a service, or is used to provide an address of a downlink user plane tunnel for the AMF. The second signaling may include a multicast service identifier, for example, a QoS flow identifier (QoS Flow Identifier, QFI) corresponding to a QoS flow. If both a QoS flow for a unicast service and a QoS flow for a multicast service exist, the second signaling includes a QFI of the unicast service and a unicast service flow identifier such as a QFI. The UE1 is used as an example. The CU-CP or the CU adds a QFI 1 and a QFI A&B to the second signaling.

In Embodiment 7, a tunnel (for example, a tunnel of a QoS flow) used for a unicast service and a tunnel (for example, a tunnel of a QoS flow) used for a multicast service are established in one PDU session, and signaling is optimized, to support transmission of a multicast service on the interface between the core network node and the access network node. Compared with the conventional technology in which one PDU session corresponds to one tunnel, in this embodiment of this application, two tunnels are established in one PDU session, to transmit a multicast service on a tunnel used for the multicast service. This helps improve transmission efficiency of the multicast service.

Embodiment 8

This embodiment of this application provides a session that is related to a terminal device and that is dedicated to transmitting multicast service information or data and a user plane transmission tunnel corresponding to the session, and optimizes existing signaling, to better support transmission of a multicast service on an interface between an access network node and a core network node. For example, the session dedicated to transmitting the multicast service is a PDU session (which may also be referred to as a multicast PDU session), a downlink user plane tunnel corresponding to the PDU session is a GTP-U tunnel, and the multicast service information or data may be a multicast QoS flow.

The following uses a PDU session as an example for description. In this embodiment of this application, a PDU session dedicated to transmitting a multicast service and a corresponding user plane tunnel are established. A same multicast service uses a same user plane tunnel, and one multicast service in one PDU session uses a same service identifier or a same service QoS flow identifier, for example, a QFI. All terminal devices that receive a multicast service or that are interested in the multicast service receive the service or information about the service by using a same PDU session. For example, QoS flows are transmitted through a same user plane tunnel.

Figures 14, 15:
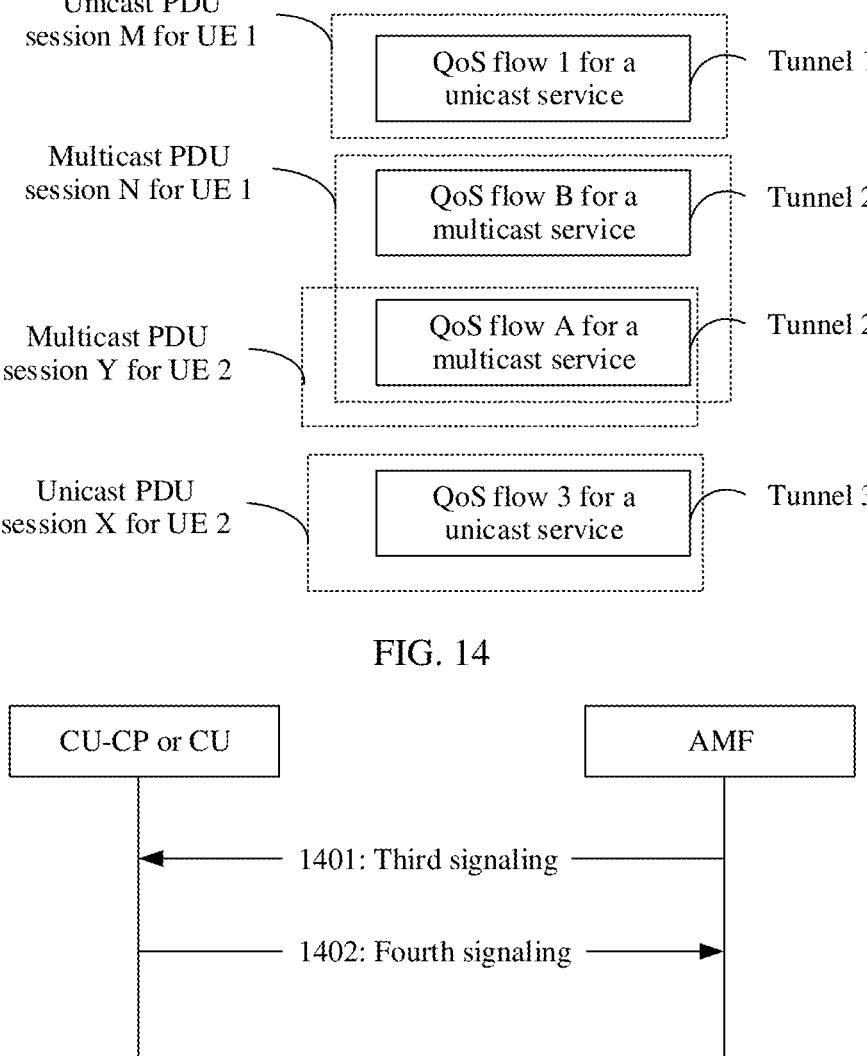
FIG. 14 is a schematic diagram of an example of yet another communications method according to an embodiment of this application.
FIG. 15 is a schematic diagram of another example of yet another communications method according to an embodiment of this application.

A user plane tunnel in this embodiment of this application is described herein with reference to an example in FIG. 14. As shown in FIG. 14, UE 1 receives information carried in unicast transmission (or a unicast service), such as a QoS flow 1, and information carried in multicast transmission (or a multicast service), such as a QoS flow A&B. UE 2 receives information carried in unicast transmission, such as a QoS flow 3, and information carried in multicast transmission, such as a QoS flow A. In FIG. 14, two PDU sessions (a multicast PDU session M and a unicast PDU session N) are established for the UE 1, and each PDU session corresponds to one tunnel (that is, a GTP-U tunnel). A tunnel 1 carries the information about the unicast service, for example, the QoS flow 1, and the tunnel 2 carries the information about the multicast service, for example, the QoS flow A&B. Two PDU sessions (a multicast PDU session Y and a unicast PDU session X) are established for the UE 2, that is, two tunnels: A tunnel 3 carries the QoS flow 3 for the unicast service, and a tunnel 2 carries the QoS flow A for the multicast service.

To adapt to the PDU session, this embodiment of this application further provides signaling applicable to establishment or modification of the PDU session. The signaling applicable to the PDU session may be a message or signaling transmitted through an interface between a core network node and an access network node (for example, a CU or a CU-CP). For example, the interface between the core network node and the access network node may be an NG interface. However, this embodiment of this application is not limited thereto. The signaling applicable to the PDU session may be used to establish a context or a PDU session.

For example, the message or the signaling transmitted through the interface between the core network node and the access network node (for example, the CU or the CU-CP) includes an initial context setup request (INITIAL CONTEXT SETUP REQUEST) &initial context setup response (INITIAL CONTEXT SETUP RESPONSE), or a PDU session resource setup request (PDU SESSION RESOURCE SETUP REQUEST) &PDU session resource setup response (PDU SESSION RESOURCE SETUP RESPONSE).

For the signaling applicable to the PDU session, signaling sent by the core network node to the access network node is denoted as third signaling. The third signaling includes a PDU session ID of a QoS flow used to transmit a multicast service. Optionally, the third signaling includes a multicast QoS flow identifier (for example, a QFI) and a multicast service identifier (for example, an MSID). Optionally, the third signaling may not include information about an uplink user plane tunnel for a multicast service (the information about the uplink user plane tunnel includes an uplink user plane address).

For the signaling applicable to the PDU session, signaling sent by the access network node to the core network node is denoted as fourth signaling. The fourth signaling is used to notify the core network node that a corresponding PDU session has been established for a service. Optionally, information about a downlink user plane tunnel used to transmit a multicast service may be added to the fourth signaling (the information about the downlink user plane tunnel includes a downlink user plane address).

Description is provided herein with reference to an interaction diagram in FIG. 15. FIG. 15 is described by using an example in which the core network node is an AMF, and the access network node is a CU-CP (when a CU-UP and a CU-CP are split) or a CU (when a CU-UP and a CU-CP are not split).

As shown in FIG. 15, the method includes the following steps.

1401: The AMF sends third signaling to the CU-CP or the CU. The third signaling is used to request to establish one or more PDU sessions, and the PDU session may be used to transmit unicast service information or multicast service information, for example, a QoS flow.

Specifically, the third signaling may be, for example, an initial context setup request or a PDU session resource setup request.

Content of signaling for establishing a PDU session used for a unicast service does not change. For details, refer to descriptions in an existing standard. However, signaling for establishing a PDU session used for a QoS flow for a multicast service changes as follows:

Optionally, the third signaling needs to carry a PDU session ID used to transmit a QoS flow for a multicast service. A structure of the PDU session ID used to transmit the QoS flow for the multicast service may be the same as a structure of a PDU session ID used to transmit a QoS flow for a unicast service, or may be an ID form specific to or newly introduced for the QoS flow for the multicast service. This is not specifically limited.

Optionally, to establish a PDU session used to transmit multicast service information, for example, a QoS flow, information about an uplink tunnel (the information about the uplink tunnel includes an uplink user plane address) corresponding to a multicast service may be removed (or not provided) from the third signaling. For example, the third signaling does not include information about an uplink user plane tunnel used for a multicast service (UL NG-U UP TNL Information for MBS service), that is, the core network node does not need to provide an uplink address of the multicast service for the CU-CP or the CU. This is because the multicast service is generally a downlink service.

Optionally, to establish a PDU session used to transmit a multicast service, for multicast service information such as a QoS flow, the core network node provides the CU-CP or the CU with more related information or identifiers of the service, for example, related information or identifiers of the QoS flow. Optionally, the third signaling includes a 5QI, an ARP, and the like of the QoS flow, a multicast QoS flow identifier (for example, a QFI), a multicast service identifier (for example, an MSID), and the like. Optionally, the third signaling may further include a multicast security parameter. For descriptions of the multicast security parameter, refer to the foregoing descriptions. Optionally, the multicast security parameter includes an AS security parameter used to activate each multicast service (for example, a QoS flow) (if security activation is required), and a NAS security parameter used to activate each multicast service (if security activation is required). Optionally, information about the NAS security parameter may be carried in a NAS PDU.

1402: The CU-CP or the CU sends fourth signaling to the AMF. The fourth signaling is used to respond to the third signaling. Specifically, the fourth signaling may be, for example, an initial context setup response or a PDU session resource setup response.

The UE 1 is used as an example. For a newly established PDU session used for multicast transmission, information about a downlink user plane tunnel used to transmit a multicast service, for example, information about a downlink user plane tunnel used for an MBS service (DL NG-U UP TNL Information for MBS service), needs to be added to the fourth signaling. That is, the CU-CP or the CU indicates, to the AMF, the information about the downlink user plane tunnel used to receive the multicast service information. Optionally, the information about the downlink user plane tunnel includes an endpoint IP address (Endpoint IP Address), a tunnel endpoint identifier GTP-TEID, and the like.

After establishing the different PDU sessions used to carry the multicast service and the unicast transmission service, the CU-CP or the CU returns response signaling, that is, the fourth signaling, to the AMF. Because a QoS flow for multicast transmission is the same for all UEs, a QFI of corresponding QoS needs to be carried, to indicate a service carried on a channel. For example, a QFI 1 and a QFI A&B are carried in the fourth signaling.

In Embodiment 8, a PDU session dedicated to multicast transmission is established, and signaling is optimized to adapt to the PDU session, to support a multicast service on the interface between the core network node and the access network node. Compared with Embodiment 7 in which two tunnels separately used for a unicast service and a multicast service are established in one PDU session, the PDU session in Embodiment 8 of this application is dedicated to multicast transmission. The PDU session is related to a terminal device, and can provide a better service for transmission of a multicast service of the terminal device.

Embodiment 9

This embodiment of this application provides a session dedicated to transmitting multicast service information or data and a user plane transmission tunnel corresponding to the session, and newly adds signaling applicable to the session, to support transmission of the multicast service information or data on an interface between an access network node and a core network node. The session may be established in advance, or establishment of the session may be triggered only when a terminal device requests the session. This is not specifically limited. In addition, the core network node may further establish a tunnel corresponding to the session, that is, a downlink user plane tunnel used to transmit the multicast service information or data. The core network node may provide information about the downlink user plane tunnel. For example, the downlink user plane tunnel may be a GTP-U tunnel used to transmit a multicast QoS flow. For example, the session may be an MBS session, and the MBS session is a session that is not related to UE (Non-UE related Session). The MBS session is used as an example. The core network node requests, based on an existing multicast service that may be sent by the access network node, to establish a corresponding MBS session with the access network node, and configures a corresponding resource, so that a network can use the resource when starting to broadcast a multicast service. For example, a downlink user plane tunnel corresponding to the session is a GTP-U tunnel. For example, the multicast service information or data may be a multicast QoS flow. The following uses an MBS session as an example for description. In this embodiment of this application, a session used to transmit a multicast service and a corresponding user plane tunnel are established. The terminal device receives a same multicast service by using a same session and a same downlink user plane tunnel. In this way, the established session and the established downlink user plane tunnel may not be related to the terminal device. Compared with a case of establishing a session and a downlink user plane tunnel that are related to the terminal device, this embodiment of this application is more flexible.

An MBS session in this embodiment of this application is described herein with reference to an example in FIG. 16. As shown in FIG. 16, UE 1 receives unicast transmission or a unicast service, such as a QoS flow 1, and multicast transmission or a multicast service, such as a QoS flow A&B. UE 2 receives unicast transmission (or unicast service) information, such as a QoS flow 3, and multicast transmission or multicast service information, such as a QoS flow A. An MBS session tunnel 2 in FIG. 16 is used as an example. The MBS session tunnel 2 is an MBS session that is provided in this embodiment of this application and that is dedicated to a QoS flow service for multicast transmission (or a multicast service). All UEs working on such a base station receive a service for multicast transmission through the MBS session tunnel 2. An establishment/configuration granularity of the multicast session is between one core network node and one access network node, and is not related to UE that receives a service.

To adapt to the MBS session, this embodiment of this application further provides signaling applicable to the MBS session. The signaling applicable to the MBS session may be a message or signaling transmitted through an interface between a core network node and an access network node (for example, a CU or a CU-CP). For example, the interface between the core network node and the access network node may be an NG interface. However, this embodiment of this application is not limited thereto. The signaling applicable to the MBS session may be used to establish a context or an MBS session.

For example, the message or the signaling transmitted through the interface between the core network node and the access network node (for example, the CU or the CU-CP) includes an MBS session setup request message (MBS Session Setup Request message) and an MBS session setup response (MBS Session Setup Response).

For the signaling applicable to the MBS session, signaling sent by the core network node to the access network node is denoted as fifth signaling. Optionally, the fifth signaling includes a multicast QoS flow identifier (for example, a QFI) and a multicast service identifier (for example, an MSID). Optionally, the fifth signaling may include information about a security parameter and/or an algorithm that are/is used by an access stratum to perform security activation, and information about a security parameter and/or an algorithm that are/is used by a non-access stratum to perform security activation.

For the signaling applicable to the MBS session, signaling sent by the access network node to the core network node is denoted as sixth signaling. The sixth signaling is used to notify the core network node that a corresponding MBS session has been established for a service. Optionally, information about a downlink user plane tunnel used to transmit a multicast service may be added to the sixth signaling (the information about the downlink user plane tunnel includes a downlink user plane address).

Description is provided herein with reference to an interaction diagram in FIG. 17. FIG. 17 is described by using an example in which the core network node is an AMF, and the access network node is a CU-CP (when a CU-UP and a CU-CP are split) or a CU (when a CU-UP and a CU-CP are not split).

As shown in FIG. 17, the method includes the following steps.

1601: Establish an MBS session. It may be understood that the MBS session may be established in advance before a terminal device starts to receive a service, or may be established based on a request of the terminal device. The following describes an MBS session establishment process with reference to steps 1601*a* and 1601*b*.

1601*a*: The AMF sends fifth signaling to the CU-CP or the CU. The fifth signaling is used to request to establish an MBS session, and the MBS session may be used to transmit a QoS flow for a multicast service.

Specifically, the fifth signaling may be, for example, an MBS session setup request message. The fifth signaling includes information about the QoS flow for the multicast service that is to be transmitted in the MBS session.

Optionally, the fifth signaling includes one or more of the following: The AMF may deliver information and an identifier of a multicast service or a service flow to the CU-CP or the CU, for example, a 5QI, an ARP, a QFI service flow identifier, and a multicast service identifier MSID that correspond to the service, and a multicast security parameter (if security activation is required). For descriptions of the multicast security parameter, refer to the foregoing descriptions. Optionally, the multicast security parameter may specifically include information related to security activation of an access stratum AS and information related to security activation of a non-access stratum NAS. Optionally, information about the NAS security parameter may be carried in a NAS PDU.

1601*b*: The CU-CP or the CU sends sixth signaling to the AMF. The sixth signaling is used to respond to the fifth signaling.

Specifically, the sixth signaling may be, for example, an MBS session setup response message. The sixth signaling includes information about a downlink tunnel (the information about the downlink tunnel includes a downlink user plane address) provided by the CU-CP or the CU for a QoS flow for a related multicast service in the MBS session, for example, information about a downlink user plane tunnel (DL NG-U UP TNL Information). The sixth signaling may further include a QFI corresponding to the QoS flow.

A GTP-U tunnel between the CU or the CU-CP and the AMF is established in 1601*a* and 1601*b*.

The following describes an MBS session use process with reference to 1602 and 1603.

1602: The AMF sends seventh signaling to the CU-CP or the CU. The seventh signaling is signaling for establishing a context or a PDU session for the terminal device. For a terminal device that needs to receive a multicast service or is interested in a multicast service, the seventh signaling may be further used to invoke an MBS session resource used to transmit the multicast service. Specifically, the seventh signaling may be, for example, an initial context setup request (INITIAL CONTEXT SETUP REQUEST) or a PDU session resource setup request (PDU SESSION RESOURCE SETUP REQUEST).

When a terminal device of the CU-CP or the CU needs to receive service information in a multicast transmission mode, for example, the UE 1 receives a service A&B, which corresponds to the QoS flow A&B, the AMF sends the seventh signaling to the CU-UP or the CU, so that the UE 1 can invoke the MBS session resource that is established in 1601 and that is used to transmit the multicast service. For a PDU session used for a unicast service, signaling content does not change. For an MBS session that carries a multicast service, signaling changes as follows: Information related to the MBS session is added to the signaling. That is, the AMF sends, to the CU-CP or the CU, the related information of the established MBS session used to transmit the multicast service, so that the CU-CP or the CU can receive the service for multicast transmission by using the MBS session. Optionally, the related information used to identify the MBS session includes: a multicast service identifier MSID, a multicast security parameter, and the like. For descriptions of the multicast security parameter, refer to the foregoing descriptions. Optionally, the multicast security parameter includes an AS security parameter used to activate each multicast service (if an AS layer requires security activation), and a NAS security parameter used to activate each multicast service (if a NAS layer requires security activation). Optionally, a NAS PDU may be added to the signaling, and then a parameter used to perform NAS security activation is carried in the NAS PDU.

1603: The CU-CP or the CU sends eighth signaling to the AMF. The eighth signaling is used to respond to the seventh signaling.

Specifically, the eighth signaling may be, for example, an initial context setup response (INITIAL CONTEXT SETUP RESPONSE) or a PDU session resource setup response (PDU SESSION RESOURCE SETUP RESPONSE).

Optionally, the eighth signaling includes a multicast service identifier MSID related to the MBS session.

After the MBS session resource is configured, the CU or the CU-CP receives MBS session information, and the MBS session information includes information about a downlink user plane address used to carry a service for multicast transmission. The CU or the CU-CP determines to receive the multicast service at the downlink user plane address. The CU or the CU-CP returns the eighth signaling to the AMF, and adds the corresponding MSID to the eighth signaling.

In Embodiment 9, a session used for multicast transmission is established in advance or a session used for multicast transmission is established when the UE requests the session, a corresponding resource (including a downlink user plane address and the like) is allocated, and signaling is optimized to adapt to the session, to support a multicast service on the interface between the core network node and the access network node. Compared with the PDU session in Embodiment 7 or Embodiment 8, in Embodiment 9 of this application, a session used for multicast transmission is defined. The session may not be related to the terminal device, and an existing PDU session does not need to be used. Multicast service transmission can also be implemented, and flexibility is relatively high.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

It may be further understood that the solutions in the embodiments of this application may be appropriately combined for usage, and explanations or description of terms in the embodiments may be mutually referenced or explained in the embodiments. This is not limited.

It may be further understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

The methods provided in embodiments of this application are described above in detail with reference to FIG. 1 to FIG. 17. The following describes in detail apparatuses provided in embodiments of this application with reference to FIG. 18 to FIG. 20.

Figure 18:
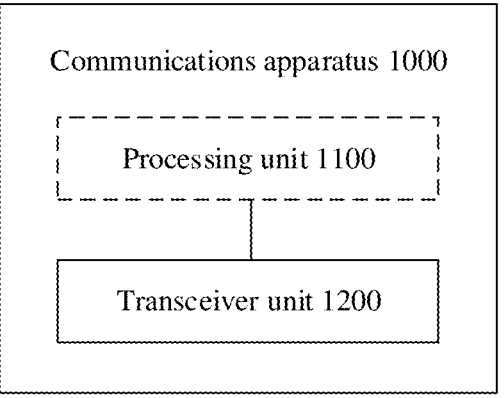
FIG. 18 is a schematic block diagram of a communications apparatus according to an embodiment of this application.

FIG. 18 is a schematic block diagram of a communications apparatus according to an embodiment of this application. As shown in FIG. 18, the communications apparatus 1000 may include a transceiver unit 1200. Optionally, the communications apparatus may further include a processing unit 1100.

In a possible design, the communications apparatus 1000 may correspond to the access network node in the foregoing method embodiments, for example, may be the access network node, or a component configured in the access network node (such as a chip or a circuit, which may be configured in the access network node).

Optionally, the communications apparatus 1000 may correspond to the first access network node in the method in embodiments of this application, and the communications apparatus 1000 may include units configured to perform the method performed by the first access network node in the method 400. In addition, the units in the communications apparatus 1000 and the foregoing other operations and/or functions are separately used to implement corresponding procedures of the method 400 in FIG. 4.

Specifically, the transceiver unit 1200 may be configured to: send a first message to a second access network node, where the first message is used to request to establish a first radio bearer, the first message includes a first indication, and the first indication indicates that the first radio bearer carries a first multicast service: receive a second message from the second access network node, where the second message includes first transport layer information corresponding to the first radio bearer; and send a first data packet of the first multicast service to the second access network node based on the first transport layer information.

Optionally, the first indication is determined based on a third message from a core network node or a multicast control function node, the third message includes a second indication, and the second indication indicates the first multicast service.

Optionally, the transceiver unit 1200 is further configured to send a third data packet of the first multicast service to the second access network node based on second transport layer information, where the second transport layer information is carried in the second message.

Optionally, the transceiver unit 1200 is further configured to send a notification message to the second access network node, where the notification message is used to indicate a transmission mode in which the second access network node sends a data packet of the first multicast service, and the transmission mode includes a unicast mode and/or a multicast mode.

Optionally, the transmission mode is determined based on a measurement result of a first terminal device.

Optionally, the third message further includes a multicast security parameter, and the multicast security parameter includes a security key and/or a security algorithm.

It should be understood that the transceiver unit 1200 may be configured to perform the receiving and/or sending step performed by the first access network node in the method 400. For brevity, examples are not listed one by one herein.

Optionally, the communications apparatus 1000 may correspond to the second access network node in the method in embodiments of this application, and the communications apparatus 1000 may include units configured to perform the method performed by the second access network node in the method 400 in FIG. 4. In addition, the units in the communications apparatus 1000 and the foregoing other operations and/or functions are separately used to implement corresponding procedures of the method 400 in FIG. 4.

Specifically, the transceiver unit 1200 is configured to: receive a first message from a first access network node, where the first message is used to request to establish a first radio bearer, the first message includes a first indication, and the first indication indicates that the first radio bearer carries a first multicast service: send a second message to the first access network node, where the second message includes first transport layer information corresponding to the first radio bearer: receive a first data packet of the first multicast service from the first access network node based on the first transport layer information; and send a second data packet of the first multicast service to a first terminal device by using the first radio bearer.

Optionally, the transceiver unit 1200 is further configured to receive a third data packet of the first multicast service from the first access network node based on second transport layer information, where the second transport layer information is carried in the second message.

Optionally, the transceiver unit 1200 is further configured to receive a notification message from the first access network node, where the notification message is used to indicate a transmission mode in which the second access network node sends a data packet of the first multicast service, and the transmission mode includes a unicast mode and/or a multicast mode.

Optionally, the transceiver unit 1200 is further configured to send a fourth message to the first access network node, where the fourth message includes a measurement result of the first terminal device.

Optionally, the processing unit 1100 is configured to determine, based on a measurement result of the first terminal device, a transmission mode for sending a data packet of the first multicast service, where the transmission mode includes a unicast mode and/or a multicast mode.

Optionally, that the transceiver unit 1200 is configured to send a second data packet of the first multicast service to a first terminal device by using the first radio bearer includes:

when the multicast mode is used, sending, to the first terminal device by using the first radio bearer, the first data packet received based on the first transport layer information: or when the unicast mode is used, sending, to the first terminal device by using the first radio bearer, the third data packet received based on the second transport layer information.

It should be further understood that the processing unit 1100 may be configured to perform the generation and/or determining step performed by the second access network node in the method 400, and the transceiver unit 1100 may be configured to perform the receiving and/or sending step performed by the second access network node in the method 400. For brevity, examples are not listed one by one herein.

Optionally, the communications apparatus 1000 may correspond to the third access network node in the method 700 in embodiments of this application, and the communications apparatus 1000 may include units configured to perform the method performed by the third access network node in the foregoing method embodiment. In addition, the units in the communications apparatus 1000 and the foregoing other operations and/or functions are separately used to implement corresponding procedures of the method 700 in FIG. 7.

Specifically, the transceiver unit 1200 may be configured to: send a fifth message to a fourth access network node, where the fifth message is used to request to establish a first radio bearer, the fifth message includes a third indication, and the third indication indicates that the first radio bearer carries a first multicast service: send a sixth message to a second access network node, where the sixth message is used to request to establish the first radio bearer, the sixth message includes a first indication, and the first indication indicates that the first radio bearer carries the first multicast service: receive a second message from the second access network node, where the second message includes first transport layer information corresponding to the first radio bearer; and send a seventh message to the fourth access network node, where the seventh message includes the first transport layer information.

Optionally, the first indication is determined based on a third message from a core network node or a multicast control function node, the third message includes a second indication, and the second indication indicates the first multicast service.

Optionally, the second message further includes second transport layer information, and the seventh message further includes the second transport layer information.

Optionally, the transceiver unit 1200 is further configured to send a notification message to the second access network node, where the notification message is used to indicate a transmission mode in which the second access network node sends a data packet of the first multicast service, and the transmission mode includes a unicast mode and/or a multicast mode.

Optionally, the transmission mode is determined based on a measurement result of a first terminal device.

Optionally, the third message includes a multicast security parameter, and the multicast security parameter includes a security key and/or a security algorithm.

Optionally, the fifth message includes the multicast security parameter, and the multicast security parameter includes the security key and/or the security algorithm.

It should be understood that the transceiver unit 1200 may be configured to perform the receiving and/or sending step performed by the third access network node in the method 400. For brevity, examples are not listed one by one herein.

Optionally, the communications apparatus 1000 may correspond to the fourth access network node in the method 700 in embodiments of this application, and the communications apparatus 1000 may include units configured to perform the method performed by the fourth access network node in the foregoing method embodiment. In addition, the units in the communications apparatus 1000 and the foregoing other operations and/or functions are separately used to implement corresponding procedures of the method 700 in FIG. 7.

Specifically, the transceiver unit 1200 may be configured to: receive a fifth message from a third access network node, where the fifth message is used to request to establish a first radio bearer, the fifth message includes a third indication, and the third indication indicates that the first radio bearer carries a first multicast service: receive a seventh message from the third access network node, where the seventh message includes first transport layer information; and send a first data packet of the first multicast service to a second access network node based on the first transport layer information.

Optionally, the transceiver unit 1200 is further configured to send a third data packet of the first multicast service to the second access network node based on second transport layer information, where the second transport layer information is carried in the seventh message.

Optionally, the fifth message includes a multicast security parameter, and the multicast security parameter includes a security key and/or a security algorithm.

It should be understood that the transceiver unit 1200 may be configured to perform the receiving and/or sending step performed by the fourth access network node in the method 700. For brevity, examples are not listed one by one herein.

Optionally, the communications apparatus 1000 may correspond to the second access network node in the method 700 in embodiments of this application, and the communications apparatus 1000 may include units configured to perform the method performed by the second access network node in the foregoing method embodiment. In addition, the units in the communications apparatus 1000 and the foregoing other operations and/or functions are separately used to implement corresponding procedures of the method 700 in FIG. 7.

Specifically, the transceiver unit 1200 may be configured to: receive a sixth message from a third access network node, where the sixth message is used to request to establish a first radio bearer, the sixth message includes a first indication, and the first indication indicates that the first radio bearer carries a first multicast service: send a second message to the third access network node, where the second message includes first transport layer information corresponding to the first radio bearer; receive a first data packet of the first multicast service from a fourth access network node based on the first transport layer information; and send a second data packet of the first multicast service to a first terminal device by using the first radio bearer.

Optionally, the transceiver unit 1200 is further configured to receive a third data packet of the first multicast service from the fourth access network node based on second transport layer information, where the second transport layer information is carried in the second message.

Optionally, the transceiver unit 1200 is further configured to receive a notification message from the third access network node, where the notification message is used to indicate a transmission mode in which the second access network node sends a data packet of the first multicast service, and the transmission mode includes a unicast mode and/or a multicast mode.

Optionally, the transceiver unit 1200 is further configured to send a fourth message to the third access network node, where the fourth message includes a measurement result of the first terminal device.

Optionally, that the transceiver unit 1200 is configured to send a data packet of the first multicast service to a first terminal device by using the first radio bearer includes: when the multicast mode is used, sending, to the first terminal device by using the first radio bearer, the data packet received based on the first transport layer information: or when the unicast mode is used, sending, to the first terminal device by using the first radio bearer, the data packet received based on the second transport layer information.

It should be understood that the transceiver unit 1200 may be configured to perform the receiving and/or sending step performed by the second access network node in the method 700. For brevity, examples are not listed one by one herein.

Optionally, the communications apparatus 1000 may correspond to the multicast control function node in the method 800 in embodiments of this application, and the communications apparatus 1000 may include units configured to perform the method performed by the multicast control function node in the foregoing method embodiment. In addition, the units in the communications apparatus 1000 and the foregoing other operations and/or functions are separately used to implement corresponding procedures of the method 800 in FIG. 10.

Specifically, the transceiver unit 1200 may be configured to: receive an eighth message from a core network node, where the eighth message is used to request to establish a first radio bearer, the eighth message includes a fourth indication, and the fourth indication indicates that the first radio bearer carries a first multicast service: send a third message to a first access network node, where the third message is used to request to establish the first radio bearer, the third message includes a second indication, and the second indication indicates that the first radio bearer carries the first multicast service; and send a notification message to the first access network node, where the notification message is used to indicate a transmission mode in which a second access network node sends a data packet of the first multicast service, and the transmission mode includes a unicast mode and/or a multicast mode.

Optionally, the transmission mode is determined based on a measurement result of a first terminal device.

Optionally, the measurement result includes a measurement report related to a beam of the first terminal device.

Optionally, the notification message further includes one or more of the following information: cell list information and beam list information for receiving the first multicast service.

It should be understood that the transceiver unit 1200 may be configured to perform the receiving and/or sending step performed by the multicast control function node in the method 800. For brevity, examples are not listed one by one herein.

Optionally, the communications apparatus 1000 may correspond to the first access network node in the method 800 in embodiments of this application, and the communications apparatus 1000 may include units configured to perform the method performed by the first access network node in the foregoing method embodiment. In addition, the units in the communications apparatus 1000 and the foregoing other operations and/or functions are separately used to implement corresponding procedures of the method 800 in FIG. 10.

Specifically, the transceiver unit 1200 may be configured to: receive a third message from a multicast control function node, where the third message is used to request to establish a first radio bearer, the third message includes a second indication, and the second indication indicates that the first radio bearer carries a first multicast service; and receive a notification message from the multicast control function node, where the notification message is used to indicate a transmission mode in which a second access network node sends a data packet of the first multicast service, and the transmission mode includes a unicast mode and/or a multicast mode.

Optionally, the transceiver unit 1200 is further configured to send a measurement result of a first terminal device to the multicast control function node, where the measurement result is used to determine the transmission mode.

Optionally, the measurement result includes a measurement report related to a beam of the first terminal device.

Optionally, the notification message further includes one or more of the following information: cell list information and beam list information for receiving the first multicast service.

It should be understood that the transceiver unit 1200 may be configured to perform the receiving and/or sending step performed by the first access network node in the method 800. For brevity, examples are not listed one by one herein.

Optionally, the communications apparatus 1000 may correspond to the multicast control function node in the method 900 in embodiments of this application, and the communications apparatus 1000 may include units configured to perform the method performed by the multicast control function node in the foregoing method embodiment. In addition, the units in the communications apparatus 1000 and the foregoing other operations and/or functions are separately used to implement corresponding procedures of the method 900 in FIG. 11.

Specifically, the transceiver unit 1200 may be configured to: receive an eighth message from a core network node, where the eighth message is used to request to establish a first radio bearer, the eighth message includes a fourth indication, and the fourth indication indicates that the first radio bearer carries a first multicast service: send a third message to a third access network node, where the third message is used to request to establish the first radio bearer, the third message includes a second indication, and the second indication indicates that the first radio bearer carries the first multicast service; and send a notification message to the third access network node, where the notification message is used to indicate a transmission mode in which a second access network node sends a data packet of the first multicast service, and the transmission mode includes a unicast mode and/or a multicast mode.

Optionally, the transmission mode is determined based on a measurement result of a first terminal device.

Optionally, the measurement result includes a measurement report related to a beam of the first terminal device.

Optionally, the notification message further includes one or more of the following information: cell list information and beam list information for receiving the first multicast service.

It should be understood that the transceiver unit 1200 may be configured to perform the receiving and/or sending step performed by the multicast control function node in the method 900. For brevity, examples are not listed one by one herein.

Optionally, the communications apparatus 1000 may correspond to the third access network node in the method 900 in embodiments of this application, and the communications apparatus 1000 may include units configured to perform the method performed by the third access network node in the foregoing method embodiment. In addition, the units in the communications apparatus 1000 and the foregoing other operations and/or functions are separately used to implement corresponding procedures of the method 900 in FIG. 11.

Specifically, the transceiver unit 1200 may be configured to: receives a third message sent by a multicast control function node, where the third message is used to request to establish a first radio bearer, the third message includes a second indication, and the second indication indicates that the first radio bearer carries a first multicast service; and receive a notification message from the multicast control function node, where the notification message is used to indicate a transmission mode in which a second access network node sends a data packet of the first multicast service, and the transmission mode includes a unicast mode and/or a multicast mode.

Optionally, the transceiver unit 1200 is further configured to send a measurement result of a first terminal device to the multicast control function node, where the measurement result is used to determine the transmission mode.

Optionally, the measurement result includes a measurement report related to a beam of the first terminal device.

Optionally, the notification message further includes one or more of the following information: cell list information and beam list information for receiving the first multicast service.

It should be understood that the transceiver unit 1200 may be configured to perform the receiving and/or sending step performed by the third access network node in the method 900. For brevity, examples are not listed one by one herein.

Figure 19:
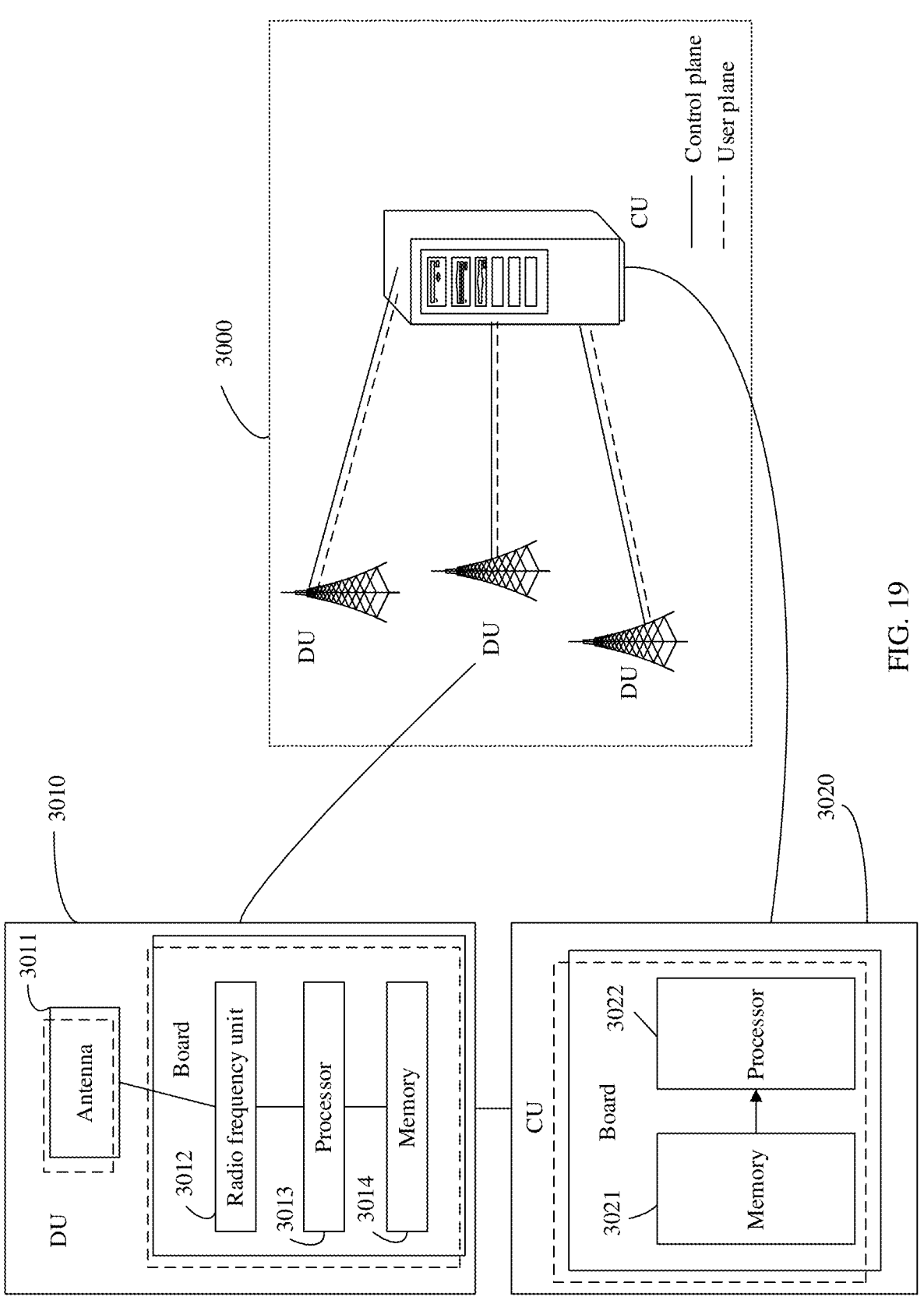
FIG. 19 is a schematic diagram of a structure of a communications apparatus according to an embodiment of this application.

It may be understood that, when the communications apparatus 1000 is an access network node (for example, the first access network node, the second access network node, the third access network node, or the fourth access network node), the transceiver unit 1200 in the communications apparatus 1000 may be implemented by a transceiver, for example, may correspond to a radio frequency unit 3012 and an antenna 3011 in an access network device 3000 shown in FIG. 19, and the processing unit 1100 in the communications apparatus 1000 may be implemented by at least one processor, for example, may correspond to a processor 3022 in the base station 3000 shown in FIG. 19.

It should be further understood that, when the communications apparatus 1000 is a chip configured in the access network device, the transceiver unit 1200 in the communications apparatus 1000 may be implemented by an input/output interface.

Optionally, the communications apparatus 1000 further includes a storage unit. The storage unit may be configured to store instructions or data. The processing unit may invoke the instructions or data stored in the storage unit, to implement a corresponding operation. The storage unit may be implemented by at least one memory, for example, may correspond to a memory 3201 in the access network device 3000 in FIG. 19.

FIG. 19 is a schematic diagram of a structure of an access network device according to an embodiment of this application, for example, may be a schematic diagram of a structure of a base station. The base station 3000 may be used in the system shown in FIG. 1 or FIG. 2, to perform functions of the access network node in the foregoing method embodiments. As shown in the figure, the base station 3000 may include one or more DUs 3010 and one or more CUs 3020. The CU 3020 may communicate with an NG core (next generation core, NC). The DU 3010 may include at least one antenna 3011, at least one radio frequency unit 3012, at least one processor 3013, and at least one memory 3014. The DU 3010 is mainly configured to: receive or send a radio frequency signal, perform conversion between a radio frequency signal and a baseband signal, and perform partial baseband processing. The CU 3020 may include at least one processor 3022 and at least one memory 3021. The CU 3020 and the DU 3010 may communicate with each other through an interface. A control plane (control plane, CP) interface may be Fs-C, for example, F1-C, and a user plane (user plane, UP) interface may be Fs-U, for example, F1-U.

The CU 3020 is mainly configured to: perform baseband processing, control the base station, and the like. The DU 3010 and the CU 3020 may be physically disposed together, or may be physically disposed separately. To be specific, the base station is a distributed base station. The CU 3020 is a control center of the base station, or may be referred to as a processing unit. The CU 3020 is mainly configured to implement a baseband processing function. For example, the CU 3020 may be configured to control the base station to perform an operation procedure related to the access network device in the foregoing method embodiments.

Specifically, baseband processing on the CU and the DU may be divided based on a protocol layer of a wireless network. For example, functions of a PDCP layer and a layer above the PDCP layer are deployed on the CU, and functions of protocol layers below the PDCP layer, such as an RLC layer and a MAC layer, are deployed on the DU. For another example, the CU implements functions of an RRC layer and a PDCP layer, and the DU implements functions of an RLC layer, a MAC layer, and a PHY layer.

Optionally, the base station 3000 may include one or more radio frequency units (RU), one or more DUs, and one or more CUs. The DU may include at least one processor 3013 and at least one memory 3014. The RU may include at least one antenna 3011 and at least one radio frequency unit 3012. The CU may include at least one processor 3022 and at least one memory 3021.

In an instance, the CU 3020 may include one or more boards, and a plurality of boards may jointly support a radio access network (for example, a 5G network) of a single access standard, or may separately support radio access networks (for example, an LTE network, a 5G network, or another network) of different access standards. The memory 3021 and the processor 3022 may serve one or more boards. In other words, a memory and a processor may be disposed on each board. Alternatively, a plurality of boards may share a same memory and a same processor. In addition, a necessary circuit may be further disposed on each board. The DU 3010 may include one or more boards, and a plurality of boards may jointly support a radio access network (for example, a 5G network) of a single access standard, or may separately support radio access networks (for example, an LTE network, a 5G network, or another network) of different access standards. The memory 3014 and the processor 3013 may serve one or more boards. In other words, a memory and a processor may be disposed on each board. Alternatively, a plurality of boards may share a same memory and a same processor. In addition, a necessary circuit may be further disposed on each board.

It should be understood that the base station 3000 shown in FIG. 19 can implement the processes related to the access network node (for example, the first access network node, the second access network node, the third access network node, or the fourth access network node) in the foregoing method embodiments. The operations and/or the functions of the modules in the base station 3000 are separately used to implement the corresponding procedures in the foregoing method embodiments. For details, refer to the descriptions in the foregoing method embodiments. To avoid repetition, detailed descriptions are properly omitted herein.

It should be understood that the base station 3000 shown in FIG. 19 is merely a possible architecture of the access network device, and should not constitute any limitation on this application. The method provided in this application is applicable to an access network device having another architecture, for example, an access network device including a CU, a DU, and an AAU. A specific architecture of the access network device is not limited in this application.

Figure 20:
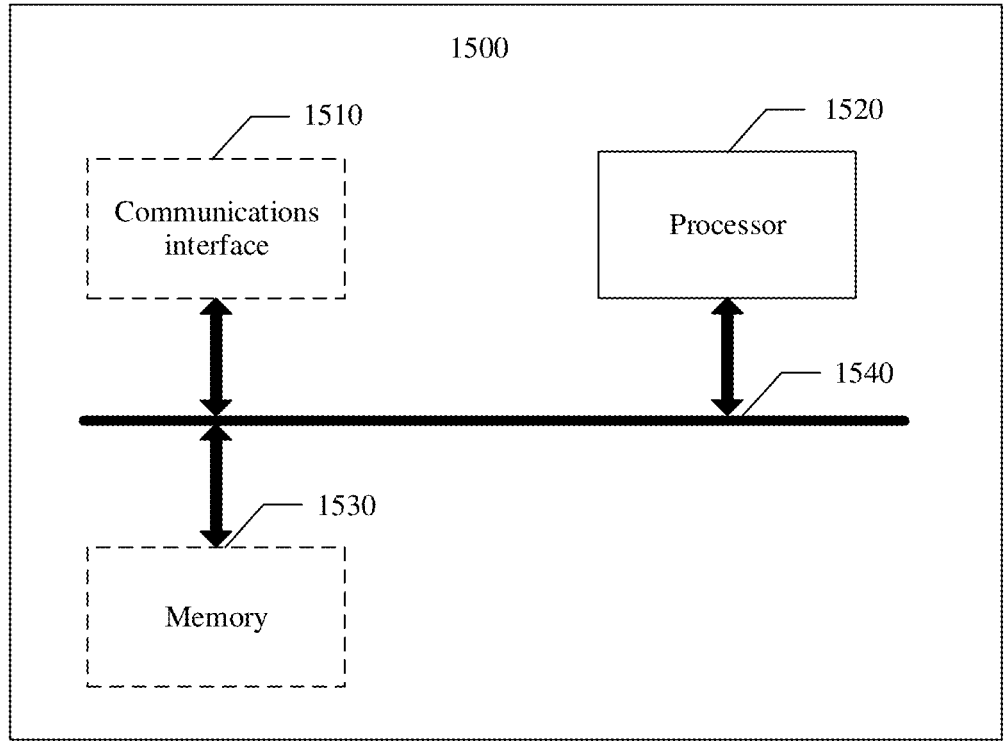
FIG. 20 is another schematic diagram of a structure of a communications apparatus according to an embodiment of this application.

FIG. 20 is a schematic diagram of a structure of a communications apparatus 1500 according to an embodiment of this application. The apparatus is configured to implement functions of the multicast control function node in the foregoing method. The apparatus may be a multicast control function node, or may be an apparatus that can be used in matching with the multicast control function node. For example, the apparatus may be installed in an access network node, or may be disposed independently. This is not limited. The apparatus may be a chip system. In this embodiment of this application, the chip system may include a chip, or may include a chip and another discrete component. The apparatus 1500 includes at least one processor 1520, configured to implement functions of the multicast control function node in the method provided in this embodiment of this application.

Optionally, the apparatus 1500 may further include at least one memory 1530, configured to store program instructions and/or data. The memory 1530 is coupled to the processor 1520. The coupling in this embodiment of this application may be an indirect coupling or a communication connection between apparatuses, units, or modules in an electrical form, a mechanical form, or another form, and is used for information exchange between the apparatuses, the units, or the modules. The processor 1520 may cooperate with the memory 1530. The processor 1520 may execute the program instructions stored in the memory 1530. At least one of the at least one memory may be included in the processor.

The apparatus 1500 may further include a communications interface 1510, configured to communicate with another device through a transmission medium, so that an apparatus in the apparatus 1500 can communicate with the another device. In this embodiment of this application, the communications interface may be a transceiver, an interface, a bus, a circuit, a pin, or an apparatus that can implement receiving and sending functions. For example, the another device may be an access network node. The processor 1520 receives and sends data through the communications interface 1510, and is configured to implement the method performed by the multicast control function node in the embodiment corresponding to FIG. 10 or FIG. 11.

A specific connection medium between the communications interface 1510, the processor 1520, and the memory 1530 is not limited in this embodiment of this application. In this embodiment of this application, in FIG. 20, the memory 1530, the processor 1520, and the communications interface 1510 are connected through a bus 1540. The bus is represented by a thick line in FIG. 20. Another manner of connection between the components is merely described as an example, and constitutes no limitation. The bus may be classified into an address bus, a data bus, a control bus, and the like. For ease of representation, only one thick line is used to represent the bus in FIG. 20, but this does not mean that there is only one bus or only one type of bus.

It should be understood that the communications apparatus shown in FIG. 20 can implement the method performed by the multicast control function node in embodiments of this application, for example, processes related to the multicast control function node in the method embodiment shown in FIG. 10 or FIG. 11. Operations and/or functions of modules in the communications apparatus are separately used to implement corresponding procedures in the foregoing method embodiments. For details, refer to the descriptions in the foregoing method embodiments. To avoid repetition, detailed descriptions are properly omitted herein.

It should be understood that the communications apparatus shown in FIG. 20 is merely a possible architecture of the multicast control function node, and should not constitute any limitation on this application.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated chip (application-specific integrated circuit, ASIC), a system on chip (system on chip, SoC), a central processing unit (central processor unit, CPU), a network processor (network processor, NP), a digital signal processor (digital signal processor, DSP), a micro controller unit (micro controller unit, MCU), a programmable controller (programmable logic device, PLD), or another integrated chip.

In an implementation process, steps in the foregoing methods can be implemented by using a hardware integrated logical circuit in the processor, or by using instructions in a form of software. The steps of the methods disclosed with reference to embodiments of this application may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, may be any conventional processor, or the like. The steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), which is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

According to the method provided in embodiments of this application, this application further provides a computer program product. The computer program product includes computer program code. When the computer program code is run on a computer, the computer is enabled to perform the method in the foregoing embodiment.

According to the method provided in embodiments of this application, this application further provides a computer-readable storage medium. The computer-readable storage medium stores program code. When the program code is run on a computer, the computer is enabled to perform the method performed by any network element in the foregoing embodiments, for example, the method performed by the first terminal device, the first access network node, or the second access network node in the embodiment shown in FIG. 4, or the method performed by the first terminal device, the third access network node, the fourth access network node, or the second access network node in the embodiment shown in FIG. 7, or the method performed by the core network node, the multicast control function node, or the first access network node in the embodiment shown in FIG. 10, or the method performed by the core network node, the multicast control function node, or the third access network node in the embodiment shown in FIG. 11.

According to the method provided in embodiments of this application, this application further provides a system, including the first access network node and the second access network node described above, or the third access network node, the fourth access network node, and the second access network node described above, or the multicast control function node and the first access network node described above, or the multicast control function node and the third access network node described above.

The access network node in the foregoing apparatus embodiments completely corresponds to the access network node in the method embodiments. A corresponding module or unit performs a corresponding step. For example, a communications unit (transceiver) performs a receiving or sending step in the method embodiments, and a processing unit (a processor) may perform a step other than the sending or receiving step. For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person skilled in the art may further understand that various illustrative logical blocks (illustrative logic block) and steps (step) that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of embodiments of this application.

The technologies described in this application may be implemented in various manners. For example, the technologies may be implemented by hardware, software, or a combination thereof. For hardware implementation, a processing unit configured to perform these technologies at a communications apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

All or some of the foregoing embodiments may be implemented by using software, hardware, firmware, or any combination thereof. When the software is used to implement the foregoing embodiments, all or some of the foregoing embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be further understood that, in this application, "when . . . ", "if", and "assuming that" all mean that the communications apparatus (the access network node or the multicast control function node) performs corresponding processing in an objective case, but do not constitute a time limitation, do not require the communications apparatus to perform a determining action during implementation, or do not mean that there is another limitation.

A person of ordinary skill in the art may understand that various numerals such as "first" and "second" in this application are merely used for differentiation for ease of description, and are not used to limit the scope of embodiments of this application or represent a sequence.

In this application, unless otherwise specified, an element represented in a singular form is intended to represent "one or more", but is not intended to represent "only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" generally indicates an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C exist. A may be singular or plural, B may be singular or plural, and C may be singular or plural.

It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for detailed working processes of the foregoing system, apparatus, and unit, refer to corresponding processes in the foregoing method embodiments. Details are not described again herein.

In the several embodiments provided in this application, it should be understood that the disclosed system, apparatus, and method may be implemented in other manners. For example, the foregoing apparatus embodiments are merely examples. For example, division into the units is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, the functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, wherein the method is applicable to a first access network node or a component in the first access network node, and the method comprises:

sending a first message to a second access network node, wherein the first message is used to indicates the second access network node that a first radio bearer is a multicast radio bearer, the first message includes a first indication, and the first indication indicates that the first radio bearer carries a first multicast service;

receiving a second message from the second access network node, wherein the second message includes first transport layer information corresponding to the first radio bearer, the first transport layer information includes address information of a multicast tunnel, wherein the multicast tunnel is used to transmit a data packet of the first multicast service sent in at least one of a unicast mode or a multicast mode;

sending a first data packet of the first multicast service to the second access network node through the multicast tunnel; and wherein the method further comprises:

receiving a ninth message from the second access network, wherein the ninth message includes a second transport layer information, the second transport layer information includes address information of a unicast tunnel, the unicast tunnel corresponds to one terminal device;

sending a third data packet of the first multicast service to the second access network node through the unicast tunnel.

2. The method according to claim 1, wherein the first indication is determined based on a third message received from a core network node, the third message includes a second indication, and the second indication indicates the first multicast service.

3. The method according to claim 1, wherein the method further comprises:

the unicast tunnel is used to transmit a data packet of the first multicast service sent in the unicast mode.

4. The method according to claim 1, wherein the method further comprises:

the multicast tunnel is shared by a plurality of terminal devices.

5. The method according to claim 1, wherein the method further comprises:

at least one of the multicast tunnel or N unicast tunnels are between the first access network node and the second access network node, N is a positive integer greater or equal to 1.

6. A communications method, wherein the method is applicable to a second access network node or a component in the second access network node, and comprises:

receiving a first message from a first access network node, wherein the first message is used to indicates the second access network node that a first radio bearer is a multicast radio bearer, the first message includes a first indication, and the first indication indicates that the first radio bearer carries a first multicast service;

sending a second message to the first access network node, wherein the second message includes first transport layer information corresponding to the first radio bearer, the first transport layer information includes address information of a multicast tunnel, wherein the multicast tunnel is used to transmit a data packet of the first multicast service sent in at least one of a unicast mode or a multicast mode;

receiving a first data packet of the first multicast service from the first access network node through the multicast tunnel;

sending a second data packet of the first multicast service to a first terminal device by using the first radio bearer; and wherein the method further comprises:

sending a ninth message to the first access network, wherein the ninth message includes a second transport layer information, the second transport layer information includes address information of a unicast tunnel, the unicast tunnel corresponds to one terminal device;

receiving a third data packet of the first multicast service from the first access network node through the unicast tunnel.

7. The method according to claim 6, wherein the sending a second data packet of the first multicast service to a first terminal device by using the first radio bearer includes:

in response to the multicast mode being used, sending, to the first terminal device by using the first radio bearer, the first data packet received based on the first transport layer information; or in response to the unicast mode being used, sending, to the first terminal device by using the first radio bearer, the third data packet received based on the second transport layer information.

8. The method according to claim 6, wherein the method further comprises:

duplicating the first data packet to obtain two data packets;

distributing the two data packets to a multicast logical channel and a unicast logical channel separately, wherein the multicast logical channel is used to transmit a data packet sent in the multicast mode, and the unicast logical channel is used to transmit a data packet sent in the unicast mode.

9. The method according to claim 6, wherein the method further comprises:

the unicast tunnel is used to transmit a data packet of the first multicast service sent in the unicast mode.

10. The method according to claim 6, wherein the method further comprises:

the multicast tunnel is shared by a plurality of terminal devices.

11. The method according to claim 6, wherein the method further comprises:

at least one of the multicast tunnel or N unicast tunnels are between the first access network node and the second access network node, N is a positive integer greater or equal to 1.

12. An apparatus, comprising:

one or more non-transitory computer readable memories storing programming to be executed by one or more processors, the programming including instructions:

one or more processors connected to the one or more non-transitory computer readable memories, wherein the processor is configured to execute the instructions to:

send a first message to a second access network node, wherein the first message is used to indicates the second access network node that a first radio bearer is a multicast radio bearer, the first message includes a first indication, and the first indication indicates that the first radio bearer carries a first multicast service;

receive a second message from the second access network node, wherein the second message includes first transport layer information corresponding to the first radio bearer, the first transport layer information includes address information of a multicast tunnel, wherein the multicast tunnel is used to transmit a data packet of the first multicast service sent in at least one of a unicast mode or a multicast mode;

send a first data packet of the first multicast service to the second access network node through the multicast tunnel; and wherein the processor is further configured to:

receive a ninth message from the second access network, wherein the ninth message includes a second transport layer information, the second transport layer information includes address information of a unicast tunnel, the unicast tunnel corresponds to one terminal device;

send a third data packet of the first multicast service to the second access network node through the unicast tunnel.

13. The apparatus according to claim 12, wherein the first indication is determined based on a third message received from a core network node, the third message includes a second indication, and the second indication indicates the first multicast service.

14. The apparatus according to claim 12, wherein the unicast tunnel is used to transmit a data packet of the first multicast service sent in the unicast mode.

15. The apparatus according to claim 12, wherein the multicast tunnel is shared by a plurality of terminal devices.

16. The apparatus according to claim 12, wherein at least one of the multicast tunnel or N unicast tunnels are between the first access network node and the second access network node, N is a positive integer greater or equal to 1.

17. An apparatus, comprising:

one or more non-transitory computer readable memories storing programming to be executed by one or more processors, the programming including instructions:

one or more processors connected to the one or more non-transitory computer readable memories, wherein the processor is configured to execute the instructions to:

receive a first message from a first access network node, wherein the first message is used to indicates the second access network node that a first radio bearer is a multicast radio bearer, the first message includes a first indication, and the first indication indicates that the first radio bearer carries a first multicast service;

send a second message to the first access network node, wherein the second message includes first transport layer information corresponding to the first radio bearer, the first transport layer information includes address information of a multicast tunnel, wherein the multicast tunnel is used to transmit a data packet of the first multicast service sent in at least one of a unicast mode or a multicast mode;

receive a first data packet of the first multicast service from the first access network node through the multicast tunnel;

send a second data packet of the first multicast service to a first terminal device by using the first radio bearer; and wherein the processor is further configured to:

send a ninth message to the first access network, wherein the ninth message includes a second transport layer information, the second transport layer information includes address information of a unicast tunnel, the unicast tunnel corresponds to one terminal device;

receive a third data packet of the first multicast service from the first access network node through the unicast tunnel.

18. The apparatus according to claim 17, wherein the one or more processors are further configured to:

duplicate the first data packet to obtain two data packets;

distribute the two data packets to a multicast logical channel and a unicast logical channel separately, wherein the multicast logical channel is used to transmit a data packet sent in the multicast mode, and the unicast logical channel is used to transmit a data packet sent in the unicast mode.

19. The apparatus according to claim 17, wherein the unicast tunnel is used to transmit a data packet of the first multicast service sent in the unicast mode.

20. The apparatus according to claim 17, wherein the multicast tunnel is shared by a plurality of terminal devices.

21. The apparatus according to claim 17, wherein at least one of the multicast tunnel or N unicast tunnels are between the first access network node and the second access network node, N is a positive integer greater or equal to 1.

22. The apparatus according to claim 17, wherein the sending a second data packet of the first multicast service to a first terminal device by using the first radio bearer includes:

in response to the multicast mode being used, sending, to the first terminal device by using the first radio bearer, the first data packet received based on the first transport layer information; or in response to the unicast mode being used, sending, to the first terminal device by using the first radio bearer, the third data packet received based on the second transport layer information.

* * * * *